United States Patent
Tian et al.

(10) Patent No.: US 11,573,725 B2
(45) Date of Patent: Feb. 7, 2023

(54) OBJECT MIGRATION METHOD, DEVICE, AND SYSTEM

(71) Applicant: Huawei Cloud Computing Technologies Co., Ltd., Guizhou (CN)

(72) Inventors: Shugang Tian, Shenzhen (CN); Pingchang Bai, Chengdu (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 16/911,974

(22) Filed: Jun. 25, 2020

(65) Prior Publication Data

US 2020/0326876 A1 Oct. 15, 2020

Related U.S. Application Data

(63) Continuation of application No. PCT/CN2017/119464, filed on Dec. 28, 2017.

(51) Int. Cl.
*G06F 3/06* (2006.01)

(52) U.S. Cl.
CPC ............ *G06F 3/0647* (2013.01); *G06F 3/067* (2013.01); *G06F 3/0611* (2013.01); *G06F 3/0617* (2013.01); *G06F 3/0629* (2013.01); *G06F 3/0653* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 9,116,914 B1* | 8/2015 | Muthirisavenugopal | .................... G06F 16/185 |
| 2008/0104343 A1* | 5/2008 | Miyagaki | .............. G06F 3/0613 711/158 |
| 2010/0274825 A1* | 10/2010 | Nemoto | ................ G06F 3/0647 707/812 |
| 2011/0213814 A1* | 9/2011 | Fukatani | ............... G06F 16/185 707/827 |
| 2012/0011329 A1* | 1/2012 | Nonaka | .................. G06F 3/067 711/154 |
| 2013/0179635 A1* | 7/2013 | Zhang | .................. G06F 3/0685 711/114 |
| 2014/0108723 A1 | 4/2014 | Nowoczynski et al. | |
| 2015/0286701 A1 | 10/2015 | Wideman | |
| 2015/0356078 A1* | 12/2015 | Kishimoto | ............ G06F 16/178 707/610 |

(Continued)

FOREIGN PATENT DOCUMENTS

| | | |
|---|---|---|
| CN | 101251797 A | 8/2008 |
| CN | 104123359 A | 10/2014 |
| CN | 105843554 A | 8/2016 |

*Primary Examiner* — Edward J Dudek, Jr.
*Assistant Examiner* — Ralph A Verderamo, III
(74) *Attorney, Agent, or Firm* — Conley Rose, P.C.

(57) ABSTRACT

A storage system includes an object storage server and a storage client, the object storage server obtains an object migration policy of a source bucket, where the object migration policy indicates a condition for migrating an object from the source bucket to a destination bucket in a plurality of buckets, and the object storage server migrates a first object in the source bucket to the destination bucket according to the policy migration policy when determining that the first object meets the object migration policy of the source bucket.

20 Claims, 11 Drawing Sheets

(56) References Cited

U.S. PATENT DOCUMENTS

| | | | |
|---|---|---|---|
| 2016/0085750 A1* | 3/2016 | Taketa | G06F 16/113 |
| | | | 707/737 |
| 2016/0179795 A1* | 6/2016 | Beard | G06F 16/119 |
| | | | 707/756 |
| 2018/0246659 A1* | 8/2018 | Agarwal | G06F 3/0605 |
| 2018/0373745 A1* | 12/2018 | Bhagwat | G06F 16/955 |

* cited by examiner

OBJECT MIGRATION METHOD, DEVICE, AND SYSTEM

CROSS-REFERENCE TO RELATED APPLICATIONS

This application is a continuation of International Patent Application No. PCT/CN2017/119464, filed on Dec. 28, 2017, which is hereby incorporated by reference in its entirety.

TECHNICAL FIELD

The present disclosure relate to the field of storage technologies, and in particular, to an object storage service (OBS) method, a device, and a system.

BACKGROUND

An OBS is an object-based massive storage service, and provides capabilities of massive, secure, reliable, and low-cost data storage for a customer. The OBS is a service oriented towards Internet access, and provides a Hypertext Transfer Protocol (HTTP)/HTTP Secure (HTTPS) protocol-based web service interface. A user may access an Internet computer anytime anywhere, and access and manage, using a client or a software development kit (SDK), data stored in the OBS. In an OBS scenario, a user file is stored on the cloud in a form of an object, a storage carrier is named a bucket, and a user may manage data of the user by performing operations such as creating, modifying, maintaining, or deleting a bucket, and uploading, downloading, or deleting an object in the bucket. Generally, both an advanced function and a value-added service of a system are configured on a bucket, and the advanced function and the value-added service are provided at a granularity of the bucket. However, in other approaches, when cross-bucket migration management needs to be performed on an object, the object can be manually migrated between different buckets by a user only based on an actual service status. In addition, in some service occasions, the user cannot be aware of an operation status of an object, for example, a frequency of accessing the object, and consequently manual cross-bucket migration cannot be completed based on the operation status of the object.

SUMMARY

Embodiments of this disclosure provide an object storage service method, a device, a system, and a storage medium such that object migration can be automatically performed between different buckets, thereby improving object migration efficiency.

According to a first aspect, an embodiment of this disclosure provides an object migration method. The method is applied to an object storage service system, the object storage service system includes an object storage server and a storage client, the object storage server manages a plurality of buckets, each bucket includes one or more objects, and the storage client uses at least two of the plurality of buckets. The object migration method is performed by the object storage server. In the method, the object storage server obtains an object migration policy of a source bucket, where the object migration policy indicates a condition for migrating an object from the source bucket to a destination bucket in the plurality of buckets, and the object storage server determines whether a first object in the source bucket meets the object migration policy of the source bucket, and migrates the first object to the destination bucket according to the policy migration policy when the first object meets the object migration policy of the source bucket.

Through processing in this implementation, the object storage server may determine, for different objects according to a preconfigured object migration policy, whether object migration processing needs to be performed, and migrate an object that meets the object migration policy to the destination bucket, without a need of performing object migration processing by the storage client according to a manual operation instruction of a user. This improves object migration efficiency.

In a possible implementation, the object storage server receives a migration policy configuration request that carries a migration policy parameter and that is sent by the storage client, where the migration policy parameter includes a bucket identifier of the source bucket corresponding to the object migration policy, a migration attribute of an object, an attribute value of the migration attribute, and a bucket identifier of the destination bucket. The migration attribute of the object may be importance of the object, or may be a frequency of accessing the object, or when the plurality of buckets are distributed in a plurality of different regions, the migration attribute of the object may be a frequency proportion of accessing the object by an access requester in a specific region, where the specific region is different from a region to which the destination bucket belongs. After receiving the migration policy configuration request, the object storage server configures the object migration policy for the source bucket based on the migration policy parameter.

In this embodiment, all objects that need to be mainly managed (for example, a frequently accessed object or an object with relatively high importance) may be placed in the destination bucket for which more value-added functions or services are configured, and other objects (for example, an infrequently accessed object or an object with relatively low importance) may be placed together in the source bucket for which fewer value-added functions or services are configured such that resource configuration and utilization can be optimized, and resources can be saved correspondingly. The bucket for which more value-added functions or services are configured needs to be supported by more resources such as network resources, processing resources, and/or storage resources.

In a possible implementation, the migration policy configuration request further includes a priority parameter, and the priority parameter is associated with the migration attribute of the object. The priority parameter is used by the object storage server to select the object migration policy of the source bucket based on the priority parameter when a plurality of object migration policies are configured for the source bucket and the first object separately meets the plurality of object migration policies.

Priorities are set for different object migration policies configured for a same bucket such that no conflict occurs when a plurality of object migration policies are set for the same bucket. Further, more refined management can be performed on object ownership of different buckets, resource configuration and utilization can be further optimized, and resources can be saved.

In a possible implementation, the object storage server further receives, from the storage client, an object access request that requests to access an object in the source bucket, and checks, according to the object access request, whether the object migration policy is configured for the source bucket, and reads the object migration policy after determining that the object migration policy is configured for the source bucket.

This embodiment provides a foreground service starting manner to start an object migration processing operation in the foregoing embodiment. For example, the storage client sends a specific object access request to start the object migration processing operation in the foregoing embodiment. In the starting manner, an object migration processing procedure is mainly performed for a specific object or an object in a specific bucket, objects in all buckets managed by the object storage server are not extensively checked, and migration processing is not performed on all objects that meet the object migration policy such that processing efficiency is relatively high, duration is relatively short, and relatively low impact is caused to another service. In addition, when starting is performed based on a service, an object migration processing procedure may be started based on activeness of a specific object. An object migration processing procedure is frequently started for an active object, and a quantity of times of starting an object migration processing procedure is correspondingly reduced for an inactive object such that processing of the object migration procedure can be pertinently performed, and processing resources can be reduced.

In a possible implementation, the object storage server periodically checks, based on a preset time, whether the object migration policy is configured for each bucket managed by the object storage server, and reads the object migration policy after determining that the object migration policy is configured for the source bucket.

This embodiment provides a manner in which an object migration processing operation in the foregoing embodiment is periodically started in the background. For example, the object migration processing operation is periodically started based on a preset time. Because in the background periodic starting scenario, an object migration processing procedure is performed on an object in the bucket managed by the object storage server, object migration processing can be relatively totally completed in a relatively timely manner. Therefore, when accessing an object, the storage client can access a migrated object in a timely manner, and object migration processing can be performed without access of the user such that resources configuration and utilization are further optimized.

In addition, in the background periodic starting scenario, scanning check and object migration processing are performed, in a specific time period, on objects in all buckets managed by the object storage server. Resources may be occupied to a slightly large extent when many buckets are involved. To avoid relatively great impact on resource utilization or another service, the object storage server may be set to perform scanning check and object migration processing on a specific quantity of buckets instead of all buckets in different time periods, and read other buckets to perform scanning check and object migration processing in another time period such that impact on resource utilization or another service can be reduced.

In a possible implementation, when the migration attribute of the object is the importance of the object, the attribute value of the migration attribute is duration for storing the object in the source bucket. In this case, the object storage server first obtains a current time of the object storage server, then obtains, through comparison, a time difference between the current time of the object storage server and a time of uploading the first object to the source bucket, and migrates the first object to the destination bucket when determining that the time difference is greater than or equal to the attribute value of the migration attribute. Importance of an object is determined based on a life cycle of the object. For example, a piece of data with high importance may become data with low importance after a specific time, and may eventually become archive data. Then all objects with relatively high importance are placed in the source bucket for which more value-added functions or services are configured, and objects with relatively low importance are placed in the destination bucket for which fewer value-added functions or services are configured such that resource configuration and utilization can be optimized, and resources can be saved correspondingly. The bucket for which more value-added functions or services are configured needs to be supported by more resources such as network resources, processing resources, and/or storage resources.

In a possible implementation, when the migration attribute of the object is the frequency of accessing the object, the attribute value of the migration attribute is a frequency value for accessing the object. In this case, the object storage server first collects statistics about a frequency of accessing the first object in the source bucket, and migrates the first object to the destination bucket after determining that the frequency of accessing the first object is greater than or equal to the attribute value of the migration attribute.

In a possible implementation, when the migration attribute of the object is the frequency of accessing the object, the attribute value of the migration attribute is a frequency value for accessing the object. In this case, the object storage server first collects statistics about a frequency of accessing the first object in the source bucket, and migrates the first object to the destination bucket after determining that the frequency of accessing the first object is less than or equal to the attribute value of the migration attribute.

All frequently accessed objects are placed in the destination bucket for which more value-added functions or services are configured, and infrequently accessed objects are placed together in the source bucket for which fewer value-added functions or services are configured such that resource configuration and utilization can be optimized, and resources can be saved correspondingly. The bucket for which more value-added functions or services are configured needs to be supported by more resources such as network resources, processing resources, and/or storage resources.

In a possible implementation, when the migration attribute of the object is the importance of the object and the frequency of accessing the object, the attribute value of the migration attribute is both a duration threshold for storing the object in the source bucket and a frequency threshold for accessing the object. In this case, the object storage server obtains a current time of the object storage server, and obtains, through comparison, a time difference between the current time of the object storage server and a time of uploading the first object to the source bucket. In addition, the object storage server further needs to collect statistics about a frequency of accessing the first object in the source bucket. Then the object storage server migrates the first object to the destination bucket after determining that the time difference is greater than or equal to the duration threshold for storing the object in the source bucket and the frequency of accessing the first object is greater than or equal to the frequency threshold for accessing the object.

Using both a frequency of accessing an object and importance of the object as a criterion for object migration, a frequently accessed object and an object with relatively high importance are placed in the destination bucket for which more value-added functions or services are configured, and an infrequently accessed object and an object with relatively low importance are placed together in the source bucket for which fewer value-added functions or services are configured such that more refined management is performed on object ownership of a bucket, resource configuration and utilization are further optimized, and resources are saved.

In a possible implementation, when the migration attribute of the object is a frequency proportion of accessing the object by an access requester in a specific region, the attribute value of the migration attribute is a frequency proportion threshold for accessing the object by the access requester in the specific region. In this case, the object storage server collects statistics about a quantity of times the first object in the source bucket is accessed by the access requester in the specific region and a quantity of times the first object in the source bucket is accessed by access requesters in the plurality of different regions. Then the object storage server obtains, through comparison, a proportion of the quantity of times the first object in the source bucket is accessed by the access requester in the specific region in the quantity of times the first object in the source bucket is accessed by the access requesters in the plurality of different regions, and migrates the first object to the destination bucket after determining that the proportion is greater than or equal to the attribute value of the migration attribute, where the region to which the destination bucket belongs is the specific region.

In a possible implementation, when the migration attribute of the object is a frequency of accessing the object by an access requester in a specific region, the attribute value of the migration attribute is a frequency threshold for accessing the object by the access requester in the specific region. In this case, the object storage server collects statistics about a frequency of accessing the first object in the source bucket by the access requester in the specific region, and migrates the first object to the destination bucket after determining that the frequency of accessing the first object in the source bucket by the access requester in the specific region is greater than or equal to the attribute value of the migration attribute, where the region to which the destination bucket belongs is the specific region.

Based on a frequency proportion of accessing an object by an access requester in a specific region, an object frequently accessed by the access requester in the specific region is migrated to the region such that a proximity-based access problem can be better resolved, thereby saving network resources and improving access effectiveness.

In a possible implementation, the object storage server further determines whether to perform switching between statistics periods, and after determining that switching to a new statistics period needs to be performed, collects, using the new statistics period, statistics about the frequency of accessing the first object in the source bucket or a frequency of accessing an object by an access requester in a specific region in the foregoing embodiment.

A statistics period is updated in a timely manner based on a specific situation, and a related statistics collection operation in the foregoing embodiment is performed based on a new statistics period such that resource configuration can be performed more dynamically and flexibly.

In a possible implementation, in a scenario in which the object access request of the storage client is to start object migration processing, the object storage server increases the quantity of times the first object in the source bucket is accessed by 1 according to the object access request of the storage client, to obtain a current quantity of times the first object in the source bucket is accessed. Then the object storage server collects, based on the current quantity of times the first object in the source bucket is accessed, statistics about the frequency of accessing the first object in the source bucket.

The access request is also considered for statistics collection such that statistics collection is more accurate, and an access status of an object can be more accurately reflected. Therefore, more refined management is performed on object ownership of a bucket, and resource configuration and utilization are more optimized.

In a possible implementation, after migrating the first object to the destination bucket, the object storage server proactively notifies the storage client, or after receiving an object access request for accessing the first object that is sent by the storage client, the object storage server notifies that the first object is migrated to the destination bucket, or after receiving an object query request for querying the first object that is sent by the storage client, the object storage server notifies that the first object is migrated to the destination bucket.

Through the proactive notification of the object storage server or the proactive advance query of the storage client, a storage location of an object created and used by the storage client may be learned of in advance such that the object can be directly accessed based on the found location during subsequent object access, thereby improving access efficiency.

According to a second aspect, an embodiment of this disclosure provides an object storage service method. The method is applied to an object storage service system, the object storage service system includes an object storage server and a storage client, the object storage server manages a plurality of buckets, each bucket includes one or more objects, and the plurality of buckets include a bucket created or used by the storage client. The method is performed by the storage client. In the method, the storage client determines a migration policy parameter, where the migration policy parameter includes an identifier of a source bucket corresponding to an object migration policy, a migration attribute of an object, an attribute value of the migration attribute, and an identifier of a destination bucket. Then the storage client sends, to the object storage server, a migration policy configuration request that carries the migration policy parameter, to request the object storage server to configure the object migration policy for the source bucket. The object migration policy indicates a condition for migrating an object from the source bucket to the destination bucket.

In this implementation, the storage client sends, to the object storage server, the migration policy configuration request that carries the migration policy parameter such that the object storage server configures a corresponding object migration policy for the bucket created or used by the storage client. In this way, the object storage server may determine, for different objects in different buckets according to a configured object migration policy, whether object migration processing needs to be performed, and migrate an object that meets the object migration policy to the destination bucket, without a need of performing object migration processing by the storage client according to a manual operation instruction of a user. This improves object migration efficiency.

In a possible implementation, the migration attribute of the object may be importance of the object, or may be a frequency of accessing the object, or when the plurality of buckets are distributed in a plurality of different regions, the migration attribute of the object may be a frequency proportion of accessing the object by an access requester in a specific region, where the specific region is different from a region to which the destination bucket belongs.

The storage client adds different migration policy parameters such that all objects that need to be mainly managed (for example, a frequently accessed object or an object with relatively high importance) may be placed in the destination bucket for which more value-added functions or services are configured, and other objects (for example, an infrequently accessed object or an object with relatively low importance) may be placed together in the source bucket for which fewer value-added functions or services are configured, thereby optimizing resource configuration and utilization and correspondingly saving resources. The bucket for which more value-added functions or services are configured needs to be supported by more resources such as network resources, processing resources, and/or storage resources.

In a possible implementation, the migration policy configuration request further includes a priority parameter, and the priority parameter is associated with the migration attribute of the object. The priority parameter is used by the object storage server to select the object migration policy of the source bucket based on the priority parameter when a plurality of object migration policies are configured for the source bucket and an object separately meets the plurality of object migration policies.

Priorities are set for different object migration policies configured for a same bucket such that no conflict occurs when a plurality of object migration policies are set for the same bucket. Further, more refined management can be performed on object ownership of different buckets, resource configuration and utilization can be further optimized, and resources can be saved.

In a possible implementation, the storage client determines, based on a configuration status of each bucket created or used by the storage client, including the source bucket, the migration policy parameter for the bucket. The configuration status of the bucket includes a value-added function or service of the bucket. The value-added function or service of the bucket includes at least one of the following network acceleration, high data reliability, storage quality of service (QoS), storage performance, proximity-based data access, or multi-version control of data.

The storage client determines the migration policy parameter of each bucket based on the configuration status of the bucket such that a better object migration policy can be configured, and an object is migrated between buckets with different levels of value-added functions or services. In this way, more refined management can be performed on object ownership of a bucket, and resource configuration and utilization can be optimized.

In a possible implementation, the storage client updates the migration policy parameter based on a change of the value-added function or service of the bucket, and sends a migration policy configuration update request to the object storage server, to request the object storage server to update the object migration policy configured for the source bucket.

The storage client updates the migration policy parameter to the object storage server in a timely manner based on a change of the configuration status of the bucket created and used by the storage client such that the object storage server correspondingly updates and adjusts the object migration policy. Therefore, management on object ownership of a bucket and resource configuration and utilization are more dynamic and flexible.

In a possible implementation, the storage client sends the migration policy configuration request to the object storage server through a bucket configuration interface between the storage client and the object storage server.

In a possible implementation, the storage client receives a notification sent by the object storage server, and the notification notifies the storage client that a first object in the source bucket is migrated to the destination bucket.

In a possible implementation, the storage client queries the object storage server for a migration status of an object in the source bucket.

According to a third aspect, an embodiment of this disclosure provides an object storage server in a form of hardware, where the object storage server manages a plurality of buckets, and each bucket includes one or more objects. The object storage server includes a policy obtaining module, a policy determining module, and a migration module. The policy obtaining module is configured to obtain an object migration policy of a source bucket, where the object migration policy indicates a condition for migrating an object from the source bucket to a destination bucket. The policy determining module is configured to determine whether a first object in the source bucket meets the object migration policy obtained by the policy obtaining module. The migration module is configured to migrate the first object to the destination bucket when the policy determining module determines that the first object meets the object migration policy.

Through processing in this implementation, the object storage server may determine, for different objects according to a preconfigured object migration policy, whether object migration processing needs to be performed, and migrate an object that meets the object migration policy to the destination bucket, without a need of performing object migration processing by a storage client according to a manual operation instruction of a user. This improves object migration efficiency.

In a possible implementation, the object storage server further includes a receiving module and a policy configuration module.

The receiving module is configured to receive a migration policy configuration request that carries a migration policy parameter and that is sent by a storage client, where the migration policy parameter includes an identifier of the source bucket, a migration attribute of an object, an attribute value of the migration attribute, and an identifier of the destination bucket. The migration attribute of the object may be importance of the object, or may be a frequency of accessing the object, or when the plurality of buckets are distributed in a plurality of different regions, the migration attribute of the object may be a frequency proportion of accessing the object by an access requester in a specific region, where the specific region is different from a region to which the destination bucket belongs. The policy configuration module is configured to configure the object migration policy for the source bucket according to the migration policy configuration request.

In this embodiment, all objects that need to be mainly managed (for example, a frequently accessed object or an object with relatively high importance) may be placed in the destination bucket for which more value-added functions or services are configured, and other objects (for example, an infrequently accessed object or an object with relatively low importance) may be placed together in the source bucket for which fewer value-added functions or services are configured such that resource configuration and utilization can be optimized, and resources can be saved correspondingly. The bucket for which more value-added functions or services are configured needs to be supported by more resources such as network resources, processing resources, and/or storage resources.

According to a fourth aspect, an embodiment of this disclosure provides a storage client in a form of hardware, where the storage client uses at least two of a plurality of buckets managed by an object storage server, and each bucket includes one or more objects. The storage client includes a migration policy determining module and a sending module. The migration policy determining module is configured to determine a migration policy parameter, where the migration policy parameter includes an identifier of a source bucket corresponding to an object migration policy, a migration attribute of an object, an attribute value of the migration attribute, and an identifier of a destination bucket. The sending module is configured to send, to the object storage server, a migration policy configuration request that carries the migration policy parameter, to request the object storage server to configure the object migration policy for the source bucket, where the object migration policy indicates a condition for migrating an object from the source bucket to the destination bucket.

In this implementation, the storage client sends, to the object storage server, the migration policy configuration request that carries the migration policy parameter such that the object storage server configures a corresponding object migration policy for a bucket created or used by the storage client. In this way, the object storage server may determine, for different objects in different buckets according to a configured object migration policy, whether object migration processing needs to be performed, and migrate an object that meets the object migration policy to the destination bucket, without a need of performing object migration processing by the storage client according to a manual operation instruction of a user. This improves object migration efficiency.

In a possible implementation, the migration attribute of the object may be importance of the object, or may be a frequency of accessing the object, or when the plurality of buckets are distributed in a plurality of different regions, the migration attribute of the object may be a frequency proportion of accessing the object by an access requester in a specific region, where the specific region is different from a region to which the destination bucket belongs.

The storage client adds different migration policy parameters such that all objects that need to be mainly managed (for example, a frequently accessed object or an object with relatively high importance) may be placed in the destination bucket for which more value-added functions or services are configured, and other objects (for example, an infrequently accessed object or an object with relatively low importance) may be placed together in the source bucket for which fewer value-added functions or services are configured, thereby optimizing resource configuration and utilization and correspondingly saving resources. The bucket for which more value-added functions or services are configured needs to be supported by more resources such as network resources, processing resources, and/or storage resources.

In a possible implementation, the migration policy determining module determines the migration policy parameter for the source bucket based on a configuration status of each bucket used by the storage client. The configuration status of the bucket includes a value-added function or service of the bucket, and the value-added function or service of the bucket includes at least one of the following network acceleration, high data reliability, storage QoS, proximity-based data access, or multi-version control of data.

The storage client determines the migration policy parameter of each bucket based on the configuration status of the bucket such that a better object migration policy can be configured, and an object is migrated between buckets with different levels of value-added functions or services. In this way, more refined management can be performed on object ownership of a bucket, and resource configuration and utilization can be optimized.

In a possible implementation, the migration policy determining module updates the migration policy parameter based on a change of the value-added function or service of the bucket, and sends, to the object storage server using the sending module, a migration policy configuration update request that carries an updated migration policy parameter, to request the object storage server to update the object migration policy configured for the source bucket.

The storage client updates the migration policy parameter to the object storage server in a timely manner based on a change of the configuration status of the bucket created and used by the storage client such that the object storage server correspondingly updates and adjusts the object migration policy. Therefore, management on object ownership of a bucket and resource configuration and utilization are more dynamic and flexible.

According to a fifth aspect, an embodiment of this disclosure provides an object storage service system, where the object storage service system includes an object storage server, a data persistence component, a metadata database, and a plurality of hard disks. The object storage server is configured to manage a plurality of buckets, where each bucket includes one or more objects, receive a migration policy configuration request that carries a migration policy parameter and that is sent by a storage client, configure an object migration policy for a source bucket based on the migration policy parameter, save the object migration policy in the metadata database, and perform, according to the object migration policy, migration processing on an object that meets the object migration policy in the source bucket, where the migration policy parameter includes an identifier of the source bucket corresponding to the object migration policy, a migration attribute of an object, an attribute value of the migration attribute, and an identifier of a destination bucket. The data persistence component is configured to save the plurality of buckets. The metadata database is configured to save the object migration policy. The plurality of hard disks are configured to provide physical storage space.

In this implementation, the object storage server may configure the object migration policy for the source bucket according to the migration policy configuration request that carries the migration policy parameter and that is sent by the storage client. Then the object storage server performs, according to the object migration policy, processing of a migration operation procedure on the object that meets the object migration policy in the source bucket. For example, the object storage server determines, for different objects in the bucket according to the object migration policy, whether object migration processing needs to be performed, and migrates the object that meets the object migration policy to the destination bucket. Therefore, the storage client does not need to perform object migration processing according to a manual operation instruction of a user. This improves object migration efficiency.

In a possible implementation, the migration attribute of the object may be importance of the object, or may be a frequency of accessing the object, or when the plurality of buckets are distributed in a plurality of different regions, the migration attribute of the object may be a frequency proportion of accessing the object by an access requester in a specific region, where the specific region is different from a region to which the destination bucket belongs.

In this embodiment, all objects that need to be mainly managed (for example, a frequently accessed object or an object with relatively high importance) may be placed in the destination bucket for which more value-added functions or services are configured, and other objects (for example, an infrequently accessed object or an object with relatively low importance) may be placed together in the source bucket for which fewer value-added functions or services are configured such that resource configuration and utilization can be optimized, and resources can be saved correspondingly. The bucket for which more value-added functions or services are configured needs to be supported by more resources such as network resources, processing resources, and/or storage resources.

In a possible implementation, the migration policy configuration request further includes a priority parameter, and the priority parameter is associated with the migration attribute of the object. Correspondingly, the object migration policy includes the priority parameter. The priority parameter is used by the object storage server to select the object migration policy of the source bucket based on the priority parameter when a plurality of object migration policies are configured for the source bucket and a first object separately meets the plurality of object migration policies.

Priorities are set for different object migration policies configured for a same bucket such that no conflict occurs when a plurality of object migration policies are set for the same bucket. Further, more refined management can be performed on object ownership of different buckets, resource configuration and utilization can be further optimized, and resources can be saved.

According to a sixth aspect, an embodiment of this disclosure provides an object storage server, where the object storage server includes a processor, the processor is coupled to a memory, and when executing a program in the memory, the processor implements the method according to any one of the first aspect or the various possible implementations of the first aspect.

For an effect of each implementation of the object storage server, refer to the descriptions in the first aspect and the various possible implementations of the first aspect and descriptions in a related part in the specification. Details are not described herein again.

According to a seventh aspect, an embodiment of this disclosure provides a storage client, where the storage client includes a processor, the processor is coupled to a memory, and when executing a program in the memory, the processor implements the method according to any one of the second aspect or the various possible implementations of the second aspect.

For an effect of each implementation of the storage client, refer to the descriptions in the second aspect and the various possible implementations of the second aspect and descriptions in a related part in the specification. Details are not described herein again.

According to an eighth aspect, an embodiment of this disclosure provides an object storage service system, where the object storage service system includes the object storage server according to any one of the third aspect or the various possible implementations of the third aspect, a data persistence component, a metadata database, and a plurality of hard disks, the data persistence component is configured to save a plurality of buckets, the metadata database is configured to save an object migration policy, and the plurality of hard disks are configured to provide physical storage space.

According to a ninth aspect, an embodiment of this disclosure provides a storage system, where the storage system includes the object storage server according to any one of the third aspect or the various possible implementations of the third aspect and the storage client according to any one of the fourth aspect or the various possible implementations of the fourth aspect.

According to a tenth aspect, an embodiment of this disclosure provides a computer-readable storage medium, where the computer-readable storage medium stores program code, and the program code is used to instruct to perform the first aspect.

According to an eleventh aspect, an embodiment of this disclosure provides a computer-readable storage medium, where the computer-readable storage medium stores program code, and the program code is used to instruct to perform the method in any possible implementation of the second aspect.

For an effect of each implementation of the computer-readable storage medium, refer to the descriptions in the foregoing corresponding part and descriptions in a related part in the specification. Details are not described herein again.

DESCRIPTION OF EMBODIMENTS

The following further describes the present disclosure in detail with reference to the accompanying drawings. Apparently, the described embodiments are merely some rather than all of the embodiments of the present disclosure.

Network architectures and service scenarios described in the embodiments of the present disclosure are intended to more clearly describe the technical solutions in the embodiments of the present disclosure, but are not intended to limit the technical solutions provided in the embodiments of the present disclosure. A person of ordinary skill in the art may learn that as the network architectures evolve and a new service scenario emerges, the technical solutions provided in the embodiments of the present disclosure are also applicable to a similar technical problem.

Figure 1:
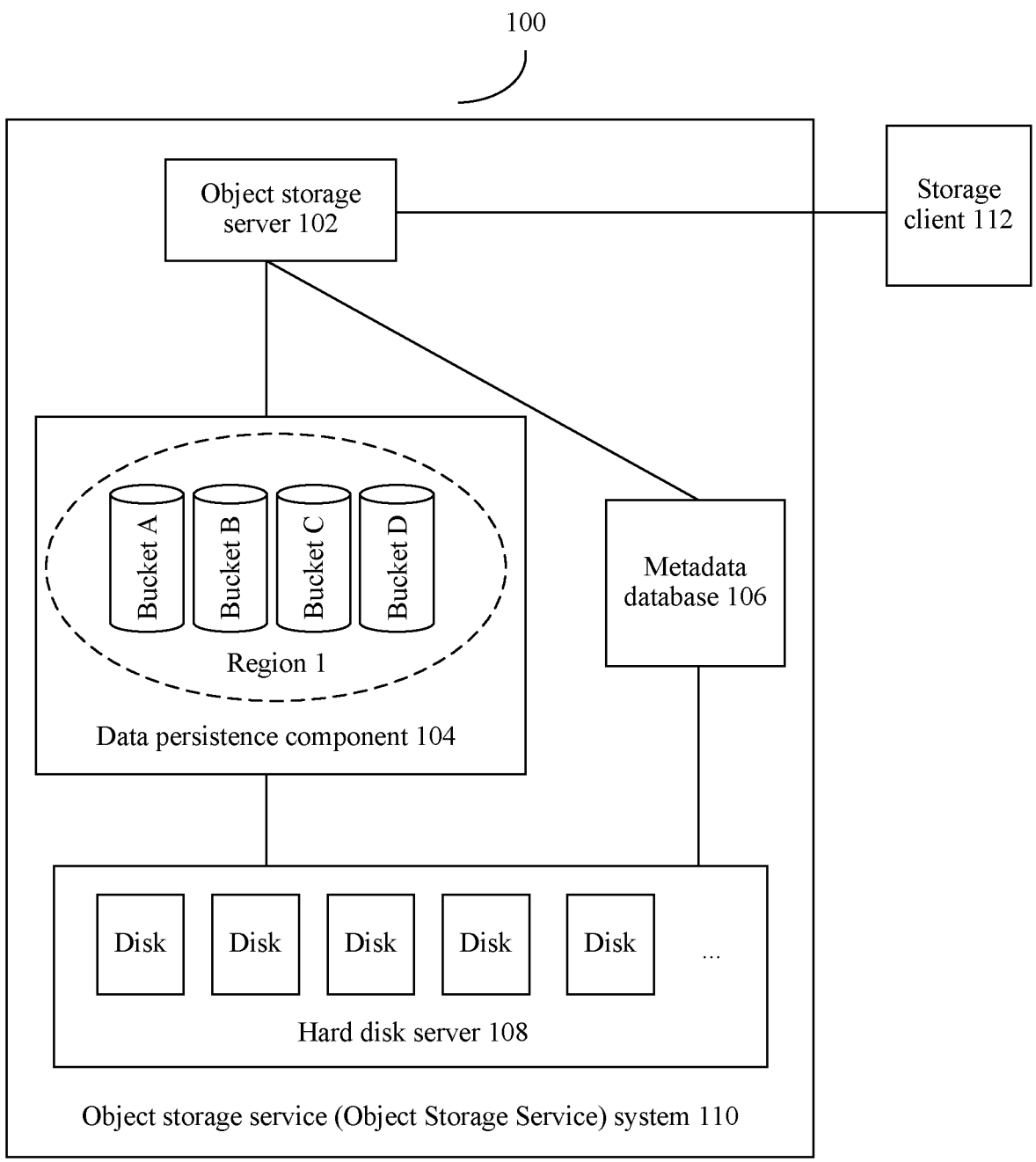
FIG. 1 is a schematic architectural diagram of a storage system according to an embodiment of the present disclosure.

The embodiments of the present disclosure may be applied to a storage system 100 shown in FIG. 1. As shown in FIG. 1, the storage system 100 includes an object storage service system 110 and a storage client 112. The object storage service system 110 includes an object storage server 102, a data persistence component 104, a metadata database 106, and a hard disk server 108. The object storage service system 110 provides an object storage service to the storage client. A user uses the object storage service using the storage client 112. For example, the user performs, using the storage client 112, various operations on data or a file stored on the cloud, such as creating, modifying, maintaining, or deleting a bucket, and manages data of the user by performing operations such as uploading, downloading, or deleting an object in the bucket.

The object storage server 102 is configured to provide an object storage interface and implement an interface function, to provide an interface for interaction between the storage client 112 and the object storage service system 110, manage a plurality of buckets, accept various operation requests of the storage client, for example, an operation request for creating, modifying, maintaining, or deleting a bucket, or uploading, downloading, or deleting an object in the bucket, perform processing according to the operation request, and return a processing result to the storage client. The object storage server 102 is further configured to receive a migration policy configuration request that carries a migration policy parameter and that is sent by the storage client 112, configure an object migration policy for a source bucket based on the migration policy parameter, save the object migration policy in the metadata database, and perform migration processing on an object in the bucket according to the object migration policy. For details, refer to detailed descriptions in the following embodiments shown in FIG. 2 to FIG. 8.

The data persistence component 104 is configured to virtualize hard disk space, provide logical space in a form of a bucket, provide a data storage interface to the object storage server 102, and save data of the user and the storage client.

The metadata database 106 is configured to provide a metadata storage interface to the object storage server 102, and save metadata and control data of the object storage service system. For the migration policy parameter described above, refer to detailed descriptions in step 306 in the following embodiment shown in FIG. 3.

The hard disk server 108 is configured to mount all hard disks of the object storage service system, and provide physical storage space to upper-layer components such as the object storage server 102, the data persistence component 104, and the metadata database 106.

It may be understood that one or more of the data persistence component 104, the metadata database 106, and the hard disk server 108 may be collectively disposed on the object storage server 102, and when the data persistence component 104, the metadata database 106, and the hard disk server 108 are collectively disposed on the object storage server 102, the object storage server 102 is equivalent to the object storage service system 110.

Figure 2:
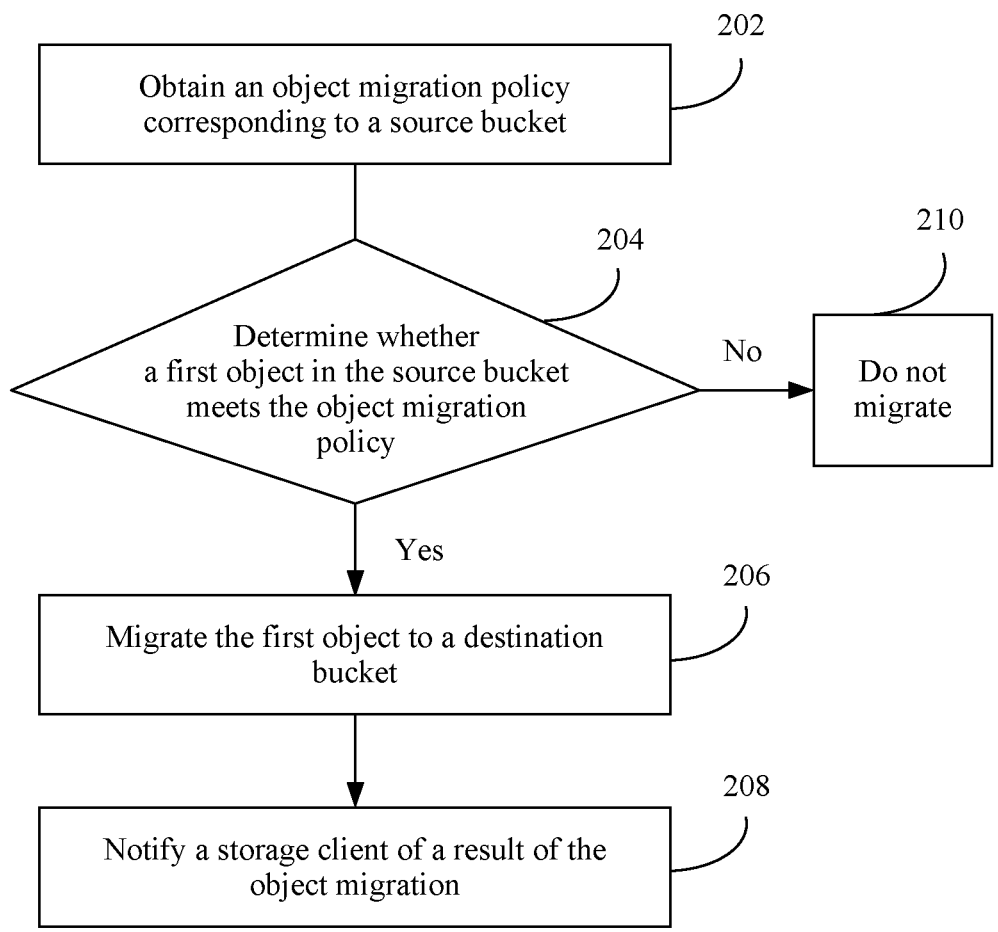
FIG. 2 is a flowchart of an object migration method according to an embodiment of the present disclosure.

FIG. 2 shows an object migration method according to an embodiment of the present disclosure. The method may be applied to the object storage service system 110 shown in FIG. 1, the object storage service system 110 includes an object storage server and a storage client, the object storage server manages a plurality of buckets, each bucket includes one or more objects, and the storage client uses at least two of the plurality of buckets. As shown in FIG. 2, the object migration method includes the following processing.

202. The object storage server obtains an object migration policy corresponding to a source bucket.

In a specific embodiment, the object storage server obtains, from a metadata database in the object storage service system, the object migration policy previously configured for the source bucket, where the object migration policy indicates a condition for migrating an object from the source bucket to a destination bucket in the plurality of buckets. For a specific configuration process of the object migration policy, refer to detailed descriptions in the embodiment shown in FIG. 3.

In this specific embodiment, the object migration policy may include at least the following migration policy parameters an identifier of the source bucket, a migration attribute of an object, an attribute value of the migration attribute, and a bucket identifier of the destination bucket. In this specific embodiment, the migration attribute of the object includes importance of the object or a frequency of accessing the object, or when the plurality of buckets are distributed in a plurality of different regions, the migration attribute of the object includes a frequency proportion or a frequency of accessing the object by an access requester in a specific region (for example, a region 1), where the specific region is different from a region (for example, a region 2) to which the destination bucket belongs.

It should be noted that the frequency proportion used in this embodiment of this disclosure indicates a ratio of two different frequencies. For example, in the foregoing embodiment, a frequency proportion of accessing an object by an access requester in a specific region is a proportion of a quantity of times the object is accessed by the access requester in the specific region in a quantity of times the object is accessed by access requesters in all region. In addition, the identifier of the bucket does not necessarily indicate a specific bucket. In some embodiments, the identifier of the bucket may indicate a type of buckets that include a plurality of destination buckets with a same feature, for example, a bucket in the region 2.

In addition, it may be understood that the migration attribute of the object may be differently set based on different service scenarios. The foregoing is merely an example for description, and does not indicate that the present disclosure is limited to only the three listed attributes of the object.

In addition, it should be noted that an object migration policy includes different migration attributes of the object, an attribute value of the migration attribute, and the bucket identifier of the source bucket and the bucket identifier of the destination bucket that are associated with the two parameters, and may be referred to as a first object migration policy. For example, the first object migration policy may include the bucket identifier of the source bucket, the importance of the object, an attribute value related to the importance, and the bucket identifier of the destination bucket. Correspondingly, a second object migration policy includes the bucket identifier of the source bucket, the frequency of accessing the object, a frequency threshold, and the bucket identifier of the destination bucket, and a third object migration policy includes the bucket identifier of the source bucket, a frequency or a frequency proportion of accessing the object by an access requester in a specific region, a frequency proportion threshold or a frequency threshold, and the bucket identifier of the destination bucket.

In another embodiment, the migration policy parameter may further include a priority parameter, and the priority parameter is associated with the migration attribute of the object. In this case, each object migration policy has a corresponding priority. The priority parameter is used to select the object migration policy of the source bucket based on the priority parameter when a plurality of object migration policies are configured for the source bucket and an object meets the plurality of object migration policies. For details, refer to detailed descriptions in step 306 in the embodiment shown in FIG. 3 and step 206.

204. The object storage server determines whether a first object in the source bucket meets the object migration policy.

Figure 6:
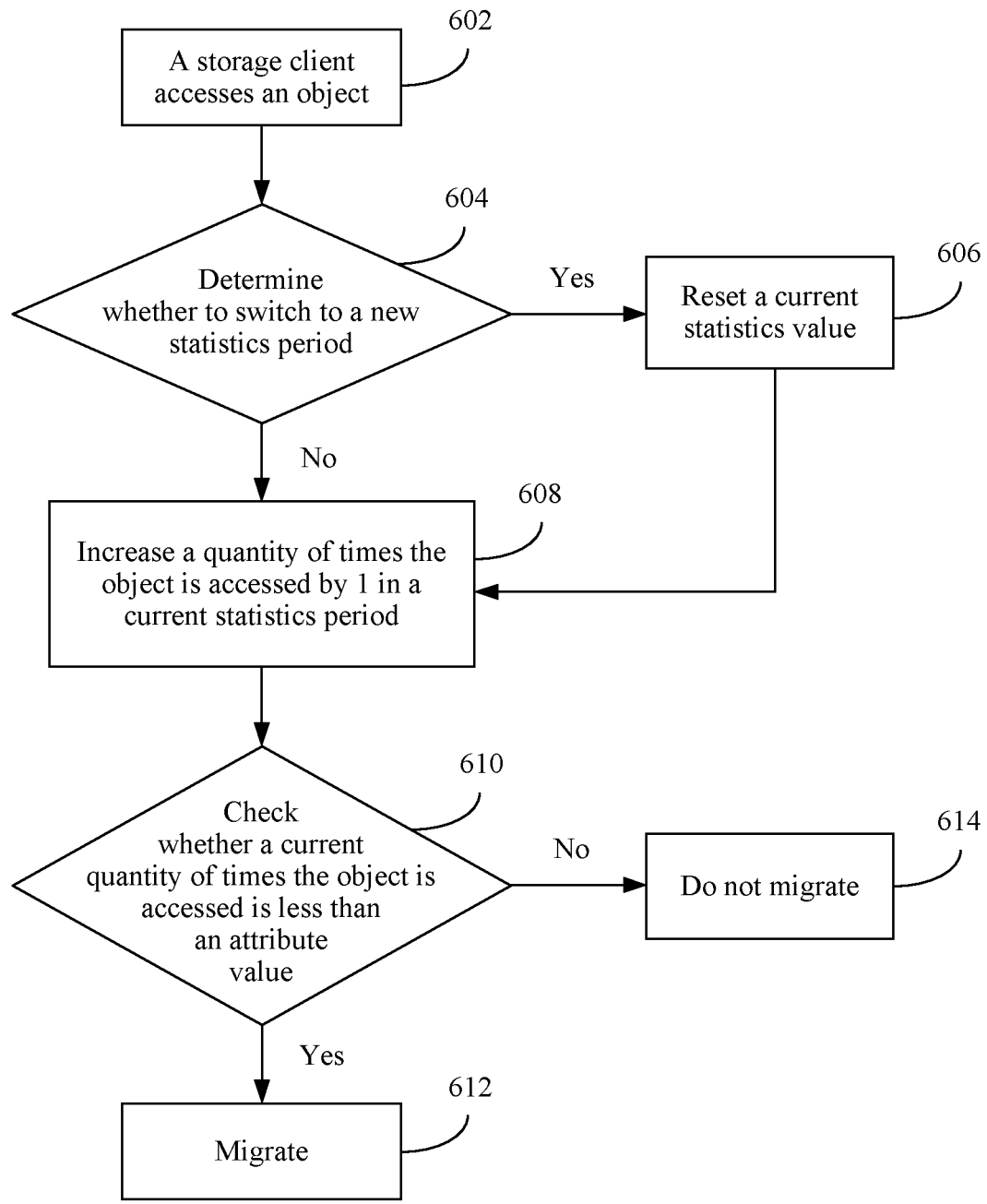
FIG. 6 is a flowchart of an object migration method according to an embodiment of the present disclosure.
Figure 7:
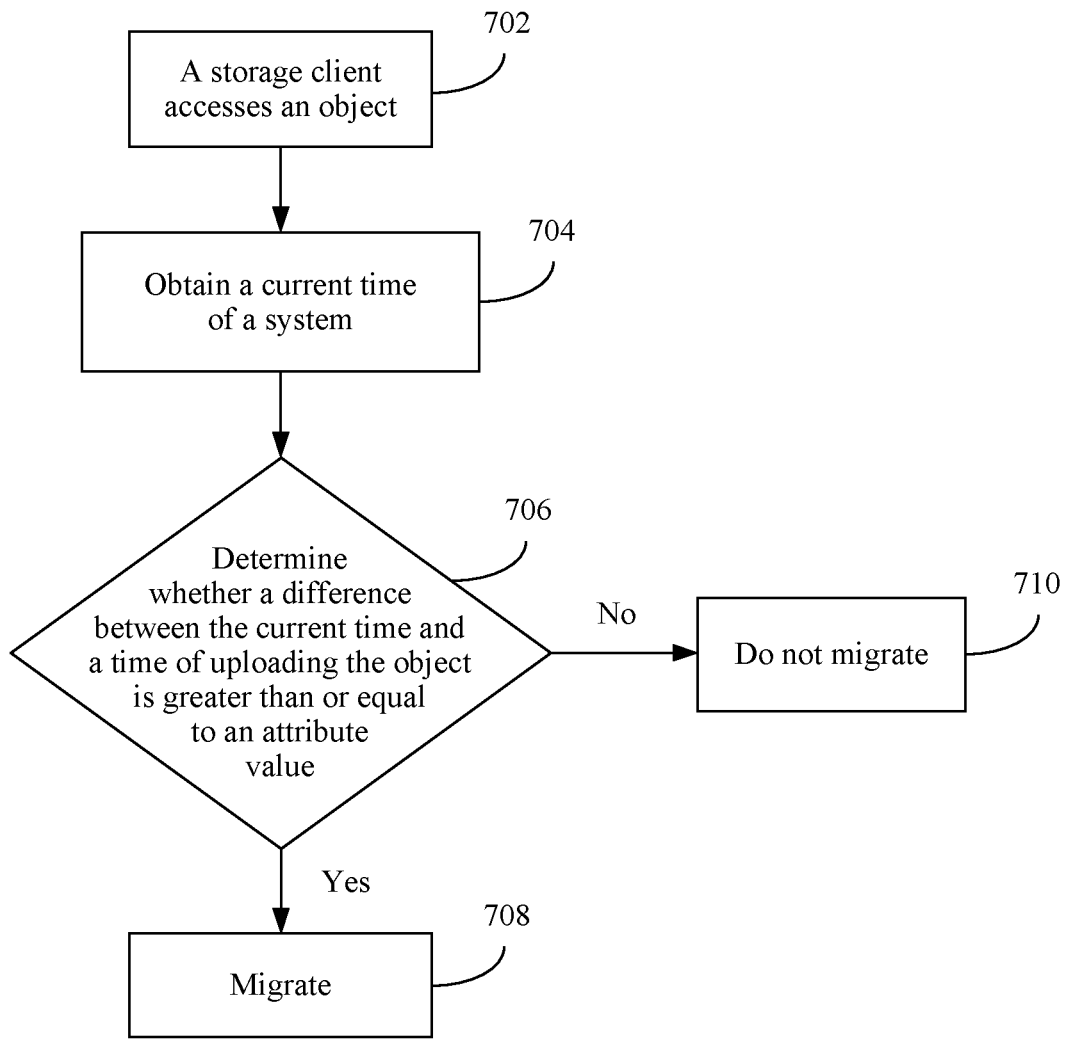
FIG. 7 is a flowchart of another object migration method according to an embodiment of the present disclosure.
Figure 8:
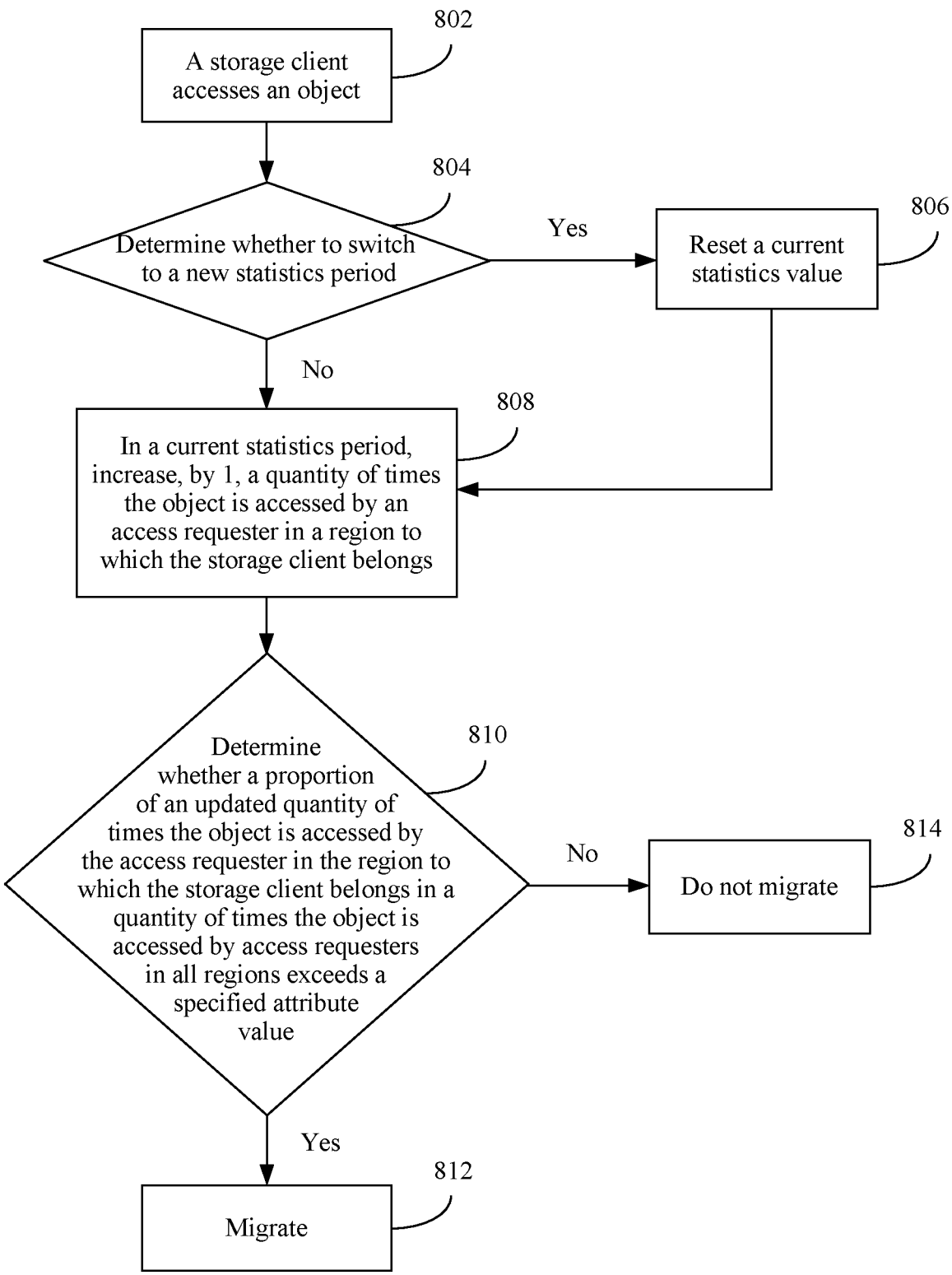
FIG. 8 is a flowchart of still another object migration method according to an embodiment of the present disclosure.

In a specific embodiment, the object storage server determines whether the first object in the source bucket meets the object migration policy configured for the source bucket. Processing of determining in a specific determining process varies with an object migration policy. For details, refer to detailed descriptions in the following embodiments shown in FIG. 6 to FIG. 8. FIG. 6 to FIG. 8 respectively illustrate processing procedures of three different object migration policies. FIG. 6 describes an object migration processing procedure for a first object migration policy in which a frequency of accessing an object is a migration attribute, FIG. 7 describes an object migration processing procedure for a second object migration policy in which importance of an object is a migration attribute, and FIG. 8 describes an object migration processing procedure for a third object migration policy in which a frequency proportion of accessing an object by an access requester in a specific region is a migration attribute.

206. The object storage server migrates the first object to a destination bucket when a result of the determining in step 204 is that the first object in the source bucket meets the object migration policy.

In a specific embodiment, after determining that the first object meets one of object migration policies, the object storage server may migrate the first object to a destination bucket corresponding to the policy. For example, when determining that the first object meets specified importance of an object and a specified attribute value related to the importance, the object storage server migrates the first object to a destination bucket corresponding to an identifier that is of the destination bucket and that corresponds to the object migration policy, and does not further determine whether the first object meets another migration attribute and a corresponding attribute value.

In another specific embodiment, after determining that the first object meets one of object migration policies, the object storage server may continue to determine whether the first object meets another object migration policy, and when the first object meets the other object migration policy and there is no conflict over a destination bucket, migrate the first object to a destination bucket indicated by an identifier of the destination bucket in each object migration policy whose condition is met.

In still another specific embodiment, after determining that the first object meets one of object migration policies, the object storage server may continue to determine whether the first object meets another object migration policy, and when the first object meets the other object migration policy and there is a conflict over a destination bucket, priorities may be set for the migration policies, and the object storage server may migrate the first object according to an object migration policy with a high priority. The priority parameter may be set in the migration policy parameter. For details, refer to the descriptions in step 202 and the detailed descriptions in step 306 in the embodiment shown in FIG. 3. It may be understood that a priority of an object migration policy may be set in another manner.

208. The object storage server notifies the storage client of a result of the object migration.

In a specific embodiment, after successfully migrating the first object, the object storage server notifies the storage client of the result of the object migration. When the identifier of the destination bucket in the object migration policy indicates a specific destination bucket, the notification message carries the bucket identifier of the destination bucket and an object identifier of the first object. When the identifier of the destination bucket in the object migration policy indicates a type of buckets with a same feature, in addition to carrying the bucket identifier of the destination bucket and the identifier of the first object, the notification message may further include identification information, such as a number, a name, or an address, of a specific destination bucket to which the first object is migrated.

In another specific embodiment, after successfully migrating the first object, the object storage server does not immediately proactively notify the storage client of the result of the object migration. In this case, the storage client can hardly be aware that a stored object is migrated, and therefore may still access an object that is not migrated in the source bucket. After receiving an object access request of the storage client, the object storage server checks whether an object corresponding to an object identifier carried in the object access request is migrated to another bucket, and when the object is migrated to the other bucket, notifies the storage client that the object is migrated to the destination bucket. The notification message may carry a bucket identifier of the destination bucket and the object identifier of the object.

In still another specific embodiment, after successfully migrating the first object, the object storage server does not immediately proactively notify the storage client of the result of the object migration, but notifies the storage client of the result of the object migration only when the storage client proactively queries location information of an object. In this case, the storage client may send an object query message to the object storage server anytime, where the object query message includes an object identifier of a queried object. After receiving an object query request of the storage client, the object storage server checks whether an object corresponding to an object identifier carried in the object query request is migrated to another bucket, and when the object is migrated to the other bucket, notifies the storage client that the object is migrated to the destination bucket. The notification message may carry a bucket identifier of the destination bucket and the object identifier of the object. The storage client performs a proactive query in advance, to learn in advance a storage location of an object created and used by the storage client such that the object can be directly accessed based on the found location during subsequent object access, thereby improving access efficiency.

210. Do not perform a migration operation on the first object when a result of the determining in step 204 is that the first object in the source bucket does not meet the object migration policy.

In a specific embodiment, after determining that the first object does not meet one of object migration policies, the object storage server may continue to determine whether the first object meets other object migration policies, and only when the first object meets none of the other object migration policies, determines that the first object in the source bucket does not meet the object migration policy of the source bucket, and does not perform migration processing on the first object.

In another specific embodiment, although the first object meets at least one object migration policy, when a conflict occurs in migration performed according to the object migration policy, for example, when a conflict occurs when no priorities are set for object migration policies, or a conflict still occurs even when priorities are set, it is considered that the first object in the source bucket does not meet the object migration policy of the source bucket.

Through processing in this implementation, the object storage server may determine, for different objects according to a preconfigured object migration policy, whether object migration processing needs to be performed, without a need of performing object migration processing by the storage client according to a manual operation instruction of a user. This improves object migration efficiency. In addition, a problem that the user cannot independently manage object ownership of a bucket can be resolved.

In addition, in this embodiment, all objects that need to be mainly managed (for example, a frequently accessed object or an object with relatively high importance) may be further placed in the destination bucket for which more value-added functions or services are configured, and other objects (for example, an infrequently accessed object or an object with relatively low importance) may be further placed together in the source bucket for which fewer value-added functions or services are configured such that resource configuration and utilization can be optimized, and resources can be saved correspondingly. The bucket for which more value-added functions or services are configured needs to be supported by more resources such as network resources, processing resources, and/or storage resources.

In actual application, before step 202 in the embodiment shown in FIG. 2, the object storage server needs to configure an object migration policy according to a migration policy of the storage client, and then obtain, based on the previously configured object migration policy, the object migration policy corresponding to the source bucket. For a specific processing procedure for configuring the object migration policy, refer to FIG. 3.

Figure 3:
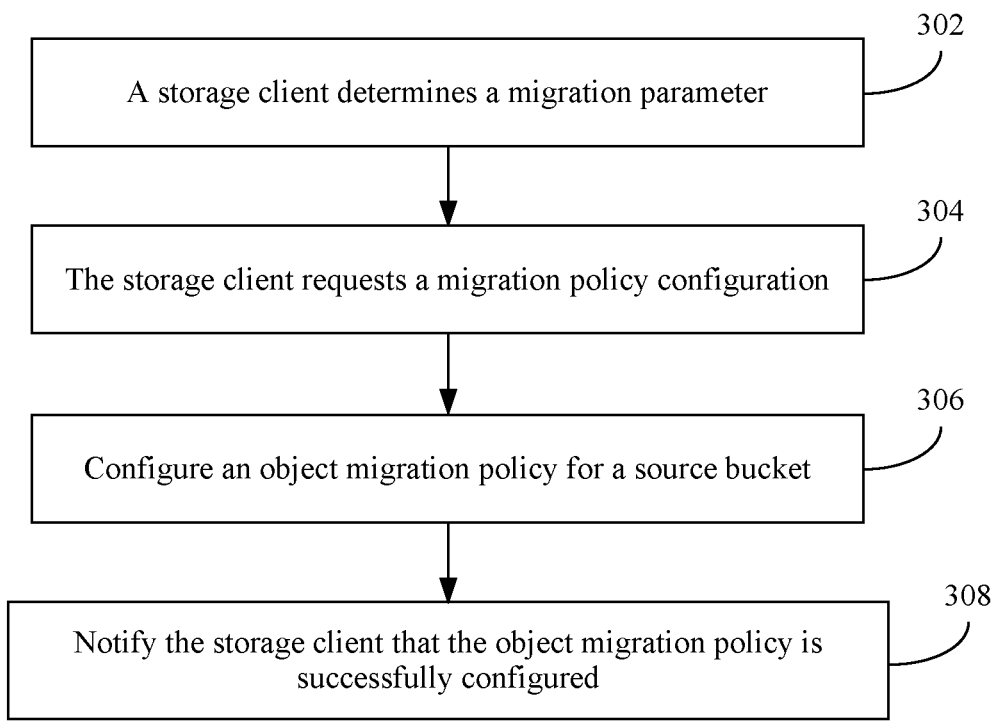
FIG. 3 is a flowchart of an object migration policy configuration method according to an embodiment of the present disclosure.

FIG. 3 shows an object migration policy configuration method according to an embodiment of the present disclosure. The method may be applied to the object storage service system 110 shown in FIG. 1. As shown in FIG. 3, the object migration method includes the following processing.

302. A storage client determines a migration policy parameter.

Referring to the descriptions in step 202, in a specific embodiment, an object migration policy includes at least the following migration policy parameters an identifier of a source bucket, a migration attribute of an object, an attribute value of the migration attribute, and an identifier of the destination bucket. The migration attribute of the object includes importance of the object or a frequency of accessing the object, or when a plurality of buckets are distributed in a plurality of different regions, the migration attribute of the object includes a frequency proportion or a frequency of accessing the object by an access requester in a specific region (for example, a region 1), where the specific region is different from a region (for example, a region 2) to which the destination bucket belongs.

In a specific embodiment, the storage client may determine, based on a configuration status of each bucket created or used by the storage client, a migration policy parameter of the bucket, including determining a migration attribute of an object in the bucket and a corresponding attribute value. The configuration status of the bucket includes a value-added function or service configured for the bucket. For example, the value-added function or service configured for the bucket includes at least one of the following network acceleration, high data reliability, storage QoS, proximity-based data access, or multi-version control of data.

The following separately illustrates cases in which different migration policy parameters are determined based on different configuration statuses of a bucket in different scenarios.

Scenario 1. For example, the storage client creates or uses two buckets a first bucket and a second bucket. A relatively high storage QoS capability is configured for the first bucket. For example, both an indicator of a quantity of transactions per second (TPS) and a concurrency indicator that are configured for the first bucket are very high, and no special requirement is imposed on an indicator of a quantity of TPS or a concurrency indicator configured for the second bucket.

In this configuration status, the storage client may need to try to place all frequently accessed objects in the first bucket, and place infrequently accessed objects in the second bucket together such that resource configuration and utilization can be optimized, and resources can be saved correspondingly. Because a bucket for which more value-added functions or services are configured needs to be supported by more resources such as network resources, processing resources, and/or storage resources, more money needs to be paid. Therefore, more costs can be saved correspondingly.

Correspondingly, the storage client determines the frequency of accessing the object as the migration attribute. The attribute value of the migration attribute, namely, a value of the frequency of accessing the object in this scenario, may be determined by the storage client according to a user instruction, for example, a command entered using a command line or a user interface, or may be determined by the storage client based on a specific scenario.

Therefore, the migration policy parameter may be determined as follows the identifier of the source bucket, an identifier of the second bucket, the frequency of accessing the object, the frequency of accessing the object greater than 100 times per day, and the identifier of the destination bucket a bucket identifier of the first bucket. Alternatively, the migration policy parameter is determined as follows the identifier of the source bucket, an identifier of the first bucket, the frequency of accessing the object, the frequency of accessing the object less than 100 times per day, and the identifier of the destination bucket a bucket identifier of the second bucket.

Scenario 2. For example, the storage client creates or uses two buckets a first bucket and a second bucket. Solid-state drive with relatively high performance is configured as a bottom-layer medium of the first bucket for the bucket, and a general storage medium with relatively low performance is configured as a bottom-layer medium of the second bucket for the bucket.

In this configuration status, the storage client may need to try to place all frequently accessed objects in the first bucket, and place infrequently accessed objects in the second bucket such that resource configuration and utilization can be optimized, and resources can be saved correspondingly.

Correspondingly, the storage client determines the frequency of accessing the object as the migration attribute. The attribute value of the migration attribute, namely, a value of the frequency of accessing the object in this scenario, may be determined by the storage client according to a user instruction, for example, a command entered using a command line or a user interface, or may be determined by the storage client based on a specific scenario.

Therefore, the migration policy parameter may be determined as follows the identifier of the source bucket, an identifier of the second bucket, the frequency of accessing the object, the frequency of accessing the object greater than 100 times per day, and the identifier of the destination bucket a bucket identifier of the first bucket. Alternatively, the migration policy parameter is determined as follows the identifier of the source bucket, an identifier of the first bucket, the frequency of accessing the object, the frequency of accessing the object less than 100 times per day, and the identifier of the destination bucket a bucket identifier of the second bucket.

Scenario 3. For example, the storage client creates or uses two buckets a first bucket and a second bucket. The first bucket has a relatively high configuration for data reliability, for example, has a relatively high data redundancy requirement and requires geographic redundancy, and the second bucket does not have a special requirement on data reliability, and only requires that a general redundancy condition be met.

In this configuration status, the storage client may need to try to place all objects with relatively high importance in the first bucket, and place objects with relatively low importance in the second bucket such that resource configuration and utilization can be optimized, and resources can be saved correspondingly.

Correspondingly, the storage client determines the importance of the object as the migration attribute. The attribute value of the migration attribute may be determined by the storage client according to a user instruction, for example, a command entered using a command line or a user interface, or may be determined by the storage client based on a specific scenario. In a specific embodiment, the attribute value may be set to storage duration of the object, and an object whose storage duration exceeds specific storage duration may be considered to have reduced importance, and therefore the object becomes unimportant. Certainly, it may be set that an object whose storage duration exceeds specific storage duration is considered to have increased importance, and therefore the object becomes more important.

Therefore, the migration policy parameter may be determined as follows the identifier of the source bucket, an identifier of the second bucket, the importance of the object, storage duration of the object (for example, greater than or equal to 30 days), and the identifier of the destination bucket a bucket identifier of the first bucket. Alternatively, the migration policy parameter is determined as follows the identifier of the source bucket, an identifier of the first bucket, the importance of the object, storage duration of the object (for example, greater than or equal to 30 days), and the identifier of the destination bucket a bucket identifier of the second bucket.

Scenario 4. For example, to resolve a proximity-based access problem, a cloud storage vendor usually establishes a plurality of region-level data centers in different cities, and each region may include a plurality of buckets. For example, HUAWEI Public Cloud deploys a first region in Beijing and deploys a second region in Hong Kong. A same storage client may create or use a bucket in a plurality of regions. For example, the storage client creates two buckets a first bucket and a second bucket, where the first bucket belongs to the first region, and the second bucket belongs to the second region. When an object in the first bucket is frequently accessed by an access requester in the second region, to better resolve a proximity-based access problem, the object that is in the first bucket belonging to the first region and that is frequently accessed by the access requester in the second region needs to be migrated to the second bucket in the second region. Therefore, network resources can be saved and access effectiveness can be improved.

In this scenario, the storage client determines, as the migration attribute, a frequency proportion or a frequency of accessing the object by the access requester in the second region. The attribute value of the migration attribute may be determined by the storage client according to a user instruction, for example, a command entered using a command line or a user interface, or may be determined by the storage client based on a specific scenario. The attribute value may be set to a proportion of a quantity of times the object is accessed by the access requester in the second region in a quantity of times the object is accessed by access requesters in all regions (for a frequency proportion case), or 100 times per day (for a frequency case).

Therefore, the migration policy parameter may be determined as follows the identifier of the source bucket, an identifier of the first bucket, the frequency proportion of accessing the object by the access requester in the second region, the proportion of the quantity of times the object is accessed by the access requester in the second region in the quantity of times the object is accessed by the access requesters in all the regions (for example, greater than or equal to 20%), and the identifier of the destination bucket a bucket identifier of the second bucket. Alternatively, the migration policy parameter is determined as follows the identifier of the source bucket, an identifier of the first bucket, the frequency of accessing the object by the access requester in the second region, the frequency of accessing the object by the access requester in the second region (for example, greater than or equal to 100 times per day), and the identifier of the destination bucket a bucket identifier of the second bucket.

Likewise, when an object in the second bucket that belongs to the second region is frequently accessed by an access requester in the first region, to better resolve a proximity-based access problem, the object that is in the second bucket belonging to the second region and that is frequently accessed by the access requester in the first region needs to be migrated to the first bucket in the first region. Therefore, network resources can be saved and access effectiveness can be improved. For a specific processing process, refer to the foregoing descriptions, and details are not described herein again.

In the foregoing four scenarios, only one or several configuration statuses of a bucket are considered. Sometimes, the migration policy parameter needs to be determined after comprehensive configuration statuses of buckets created or used by the storage client are considered. The following scenario 5 is an illustration in which the migration policy parameter is determined after all configuration statuses are considered.

Scenario 5. For example, the storage client creates or uses two buckets a first bucket and a second bucket. More value-added functions or services, for example, network acceleration, high data reliability, high storage QoS, proximity-based data access, and other configurations, are configured for the first bucket. Fewer value-added functions or services or even only basic functions and services are configured for the second bucket. In this case, the storage client may need to comprehensively consider the frequency of accessing the object, the importance of the object, and even the frequency proportion or the frequency of accessing the object by the access requester in the specific region, to determine to place, in the first bucket, objects that meet a specified attribute value of the frequency of accessing the object, a specified attribute value of the importance of the object, and a specified attribute value of the frequency proportion or the frequency of accessing the object by the access requester in the specific region, and place, in the second bucket, objects that do not meet the foregoing conditions such that resource configuration and utilization can be more optimized, and more resources can be saved.

It should be noted that the foregoing scenario is merely an example intended to help understand the technical solutions of this disclosure. In a specific implementation, as in the foregoing method, the storage client may determine the migration policy parameter in another scenario, for example, network acceleration, storage performance, proximity-based data access, or multi-version control of data. Details are not listed and described herein. A person skilled in the art can readily figure out similar processing in another scenario after reading the embodiments of this disclosure, and the similar processing falls within the protection scope of this disclosure.

It may be understood that the storage client may correspondingly modify or update the migration policy parameter based on a change of created and used buckets or a configuration update of the buckets. For the modification or updating of the migration policy parameter, refer to the foregoing processing process of determining the migration policy parameter. Details are not described herein again.

304. The storage client requests a migration policy configuration from an object storage server.

In a specific embodiment, after determining the migration policy parameter, the storage client requests the migration policy configuration from the object storage server. Specifically, the storage client may send a migration policy configuration request message to the object storage server through a newly added bucket configuration interface between the storage client and the object storage server. The migration policy configuration request message may be an OBS protocol. The migration policy configuration request message includes migration policy parameters shown as examples in Table 1.

TABLE 1

Parameters carried in the migration policy configuration request message

| Element name | Description |
| --- | --- |
| Migration attribute | Specify a migration attribute Type: String |
| Attribute value | Specify a migration attribute value Type: String |
| Source bucket ID | Specify an identifier, a name, or an address of a source bucket, namely, a bucket from which migration is performed |
| Destination bucket ID | Specify an identifier, a name, or an address of a destination bucket, namely, a bucket to which migration is performed |

It may be understood that the storage client may correspondingly modify or update the migration policy parameter based on a change of created or used buckets or a configuration update of the buckets, and then send a request to the object storage server, to instruct the object storage server to modify or update a previous configuration of the object migration policy.

The foregoing is merely an example for describing an implementation in which the storage client requests the migration policy configuration from the object storage server. In actual application, the object migration policy may be configured on the object storage server or the object storage service system in another manner. A person skilled in the art may readily figure out other configuration manners after reading the foregoing embodiment, and these other manners fall within the protection scope of this disclosure.

306. The object storage server configures an object migration policy for a source bucket.

In a specific embodiment, the object storage server configures the object migration policy based on the migration policy parameter included in the received migration policy configuration request message. Specifically, the object storage server creates (when there is previously no object migration policy for a bucket) or modifies (when there is already an object migration policy for a bucket) corresponding data in the metadata database. Specific examples are shown in Table 2 and Table 3.

The five different scenarios in step 302 are used as examples. Correspondingly, the object storage server configures an object migration policy for a bucket 1, and records that are created or modified in the metadata database are shown as examples in Table 2.

TABLE 2

Object migration policy configured by the object storage server for the bucket 1

| Source bucket identifier (ID) | Migration attribute | Attribute value | Destination bucket ID | Priority | Object migration policy |
| --- | --- | --- | --- | --- | --- |
| Bucket 1 | Frequency of accessing an object | Less than 100 times per day | Bucket 2 | 1 | Policy 1 |
| Bucket 1 | Importance of the object | Storage duration of the object is greater than or equal to 30 days | Bucket 2 | 1 | Policy 2 |

TABLE 2-continued

Object migration policy configured by the object storage server for the bucket 1

| Source bucket identifier (ID) | Migration attribute | Attribute value | Destination bucket ID | Priority | Object migration policy |
|---|---|---|---|---|---|
| Bucket 1 | Frequency proportion of accessing the object by an access requester in a second region | A proportion of a quantity of times the object is accessed by the access requester in the second region in a quantity of times the object is accessed by access requesters in all regions is greater than or equal to 20% | Bucket 2 | 2 | Policy 3 |
| Bucket 1 | Frequency of accessing the object by the access requester in the second region | Greater than or equal to 100 times per day | Bucket 2 | 2 | Policy 4 |
| Bucket 1 | Frequency of accessing the object and importance of the object | Less than 100 times per day, and storage duration of the object is greater than or equal to 30 days | Bucket 2 | 1 | Policy 5 |

The five different scenarios in step 302 are used as examples. The object storage server configures an object migration policy for a bucket 2, and records that are created or modified in the metadata database are shown as examples in Table 3.

308. The object storage server notifies the storage client that the object migration policy is successfully configured.

In a specific embodiment, the object storage server may notify, through the bucket configuration interface in step 304, the storage client that the object migration policy is

TABLE 3

Object migration policy configured by the object storage server for the bucket 2

| Source bucket ID | Migration attribute | Attribute value | Destination bucket ID | Priority | Object migration policy |
|---|---|---|---|---|---|
| Bucket 2 | Frequency of accessing an object | Greater than 100 times per day | Bucket 1 | 1 | Policy 1 |
| Bucket 2 | Importance of the object | Storage duration of the object is greater than or equal to 30 days | Bucket 1 | 2 | Policy 2 |
| Bucket 2 | Frequency proportion of accessing the object by an access requester in a first region | A proportion of a quantity of times the object is accessed by the access requester in the first region in a quantity of times the object is accessed by access requesters in all regions is greater than or equal to 20% | Bucket 1 | 2 | Policy 3 |
| Bucket 2 | Frequency of accessing the object by the access requester in the first region | Greater than or equal to 100 times per day | Bucket 1 | 2 | Policy 4 |
| Bucket 2 | Frequency of accessing the object and importance of the object | Greater than 100 times per day, and storage duration of the object is greater than or equal to 30 days | Bucket 1 | 1 | Policy 5 | successfully configured, or may notify, using another message in the OBS protocol, the storage client that the object migration policy is successfully configured.

In actual application, in the embodiment shown in FIG. 2, the object storage server may start and perform the steps in the embodiment shown in FIG. 2 in the following two cases or scenarios a foreground service starting scenario and a background periodic starting scenario. The following describes the two starting scenarios respectively in FIG. 4 and FIG. 5.

Figure 4:
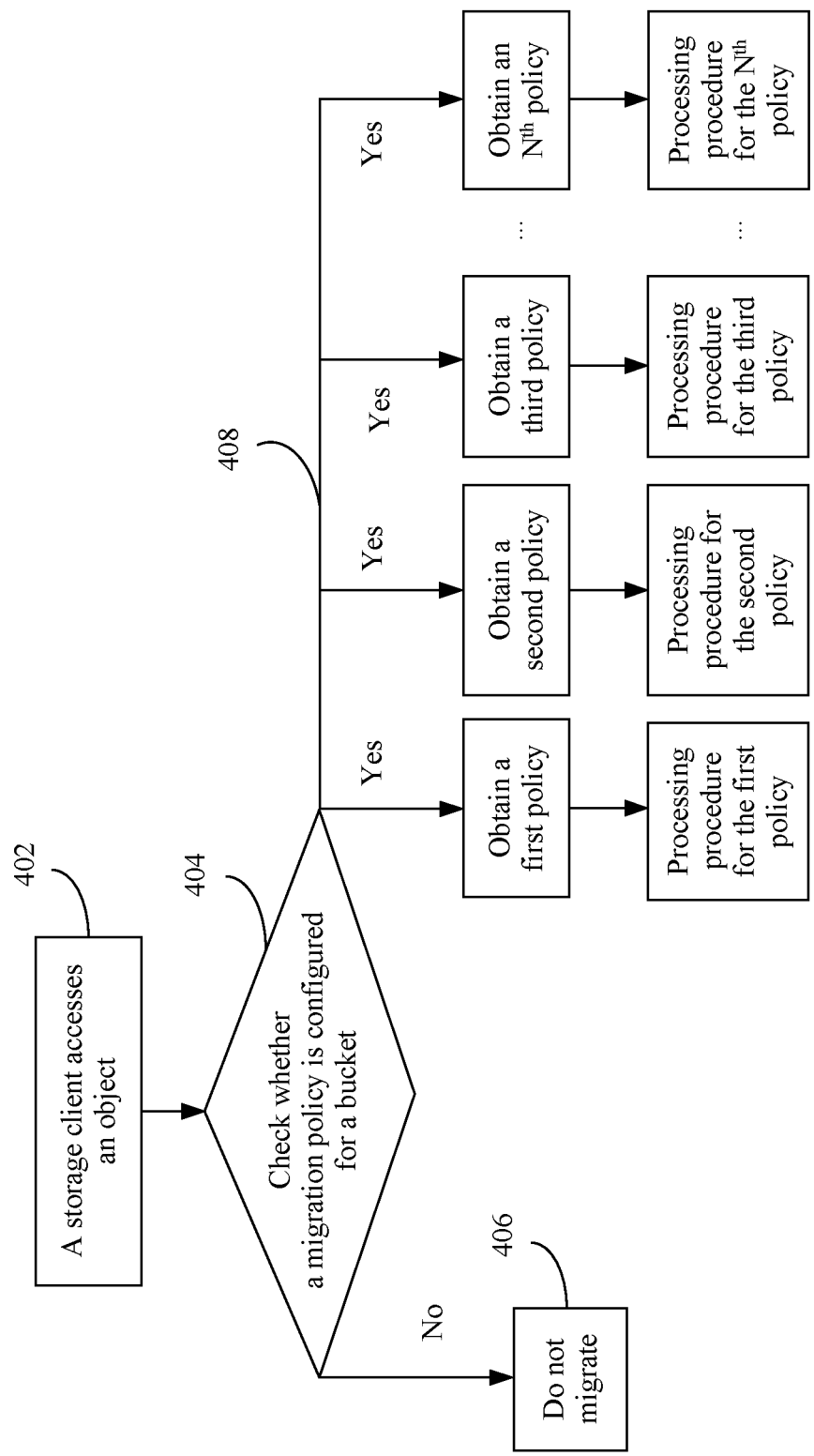
FIG. 4 is a flowchart of an actual application scenario of an object migration method according to an embodiment of the present disclosure.

FIG. 4 shows an actual application scenario of an object migration method according to an embodiment of this disclosure. The method may be applied to the object storage service system 110 shown in FIG. 1 and the method procedures shown in FIG. 2 and FIG. 3. As shown in FIG. 4, the object migration method includes the following processing.

402. A storage client accesses an object.

In a specific embodiment, the storage client sends an object access request to an object storage server using an OBS protocol, to request to access a first object in a first bucket created by the storage client. The object access request may include a bucket identifier of the first bucket and an identifier of the first object.

404. An object storage server checks whether an object migration policy is configured for a corresponding bucket.

In a specific embodiment, after receiving the object access request sent by the storage client, the object storage server checks, based on the bucket identifier added by the storage client, whether an object migration policy is configured for a bucket corresponding to the bucket identifier. For example, in a specific check process, the object storage server may query a metadata database for an object migration policy corresponding to each bucket, for example, query whether object migration policy configuration records for different buckets that are shown in Table 2 or Table 3 are recorded in the metadata database.

It should be noted that in another embodiment, when the object access request does not carry the identifier of the first object but an identifier of another object in the bucket, after determining, based on an object identifier of the object, that the object belongs to the bucket, the object storage server also checks whether an object migration policy is configured for the bucket.

406. When the object storage server determines that no object migration policy is configured for the bucket, the object storage server does not perform an object migration procedure.

In a specific embodiment, when it is determined, through a query, that an object migration policy configuration corresponding to the bucket corresponding to the bucket identifier is not recorded in the metadata database, an object migration processing procedure is not performed on an object in the bucket, for example, the object migration processing procedure in the embodiment corresponding to FIG. 2 is not performed.

408. When the object storage server determines that an object migration policy is configured for the corresponding bucket, the object storage server further obtains the object migration policy corresponding to the bucket.

In a specific embodiment, when it is determined, through a query, that an object migration policy configuration corresponding to the bucket corresponding to the bucket identifier is recorded in the metadata database, the object migration policy corresponding to the bucket is obtained based on the record. For a specific obtaining process, refer to step 202 in the embodiment shown in FIG. 2. Details are not described herein again.

When the obtained object migration policy is a first object migration policy, a subsequent operation of an object migration processing procedure is performed according to the first object migration policy. For details, refer to the processing steps 204 to 210 in the embodiment shown in FIG. 2. Details are not described herein again.

In a specific example, the first object migration policy may be the policy 1 shown in Table 2, and includes the following migration policy parameter an identifier of a source bucket, the identifier of the first bucket, namely, a bucket 1, a migration attribute of an object a frequency of accessing the object, an attribute value less than 100 times per day, and a bucket identifier of a destination bucket an identifier of a second bucket, namely, a bucket 2.

The migration policy parameter may further include a priority parameter 1, indicating a first priority.

The performing a subsequent operation of an object migration processing procedure according to the first object migration policy may specifically include determining, based on the identifier of the first object and the migration policy parameter of the first object migration policy, whether the first object in the first bucket meets the first object migration policy. For details, refer to the processing step 204 in the embodiment shown in FIG. 2. Details are not described herein again.

When the obtained object migration policy is a second object migration policy, a subsequent operation of an object migration processing procedure is performed according to the second object migration policy. For details, refer to the processing steps 204 to 210 in the embodiment shown in FIG. 2. Details are not described herein again.

In a specific example, the second object migration policy may be the policy 2 shown in Table 2, and includes the following migration policy parameter an identifier of a source bucket, the identifier of the first bucket, namely, a bucket 1, a migration attribute of an object importance of the object, an attribute value storage duration of the object is greater than or equal to 30 days, and a bucket identifier of a destination bucket an identifier of a second bucket, namely, a bucket 2.

The migration policy parameter may further include a priority parameter 1, indicating a first priority.

The performing a subsequent operation of an object migration processing procedure according to the second object migration policy may specifically include determining, based on the identifier of the first object and the migration policy parameter of the second object migration policy, whether the first object in the first bucket meets the second object migration policy. For details, refer to the processing step 204 in the embodiment shown in FIG. 2. Details are not described herein again.

Likewise, when the obtained object migration policy is a third object migration policy, a fourth object migration policy, or an $N^{th}$ object migration policy, for a processing process for the policy, refer to the foregoing processing. Details are not described herein again.

The embodiment shown in FIG. 4 is an object migration processing procedure in a foreground service starting scenario. An object migration processing procedure is started for a specific object (for example, the first object in this embodiment) based on an object access service of the storage client. It may be understood that in this starting scenario, the object storage server may further expand a determining range. To be specific, in addition to determining whether the first object meets the object migration policy corresponding to the first bucket, the object storage server may determine whether another object in the first bucket meets the object migration policy corresponding to the first bucket, and perform or not perform migration processing based on a determining result. A specific procedure is the same as that described above, and details are not described herein again.

In the foreground service starting scenario, an object migration processing procedure is mainly performed for a specific object or an object in a specific bucket, objects in all buckets managed by the object storage server are not extensively checked, and migration processing is not performed on all objects that meet the object migration policy such that processing efficiency is relatively high, duration is relatively short, and relatively low impact is caused to another service. In addition, when starting is performed based on a service, an object migration processing procedure may be started based on activeness of a specific object. An object migration processing procedure is frequently started for an active object, and a quantity of times of starting an object migration processing procedure is correspondingly reduced for an inactive object such that processing of the object migration procedure can be pertinently performed, and processing resources can be reduced.

In addition, it should be noted that in the foregoing scenario in which an object migration processing procedure is started using a foreground service, when the first object that the storage client requests to access meets the object migration policy of the first bucket, the first object is returned to the storage client according to the access request of the storage client before the first object is migrated to the destination bucket.

Figure 5:
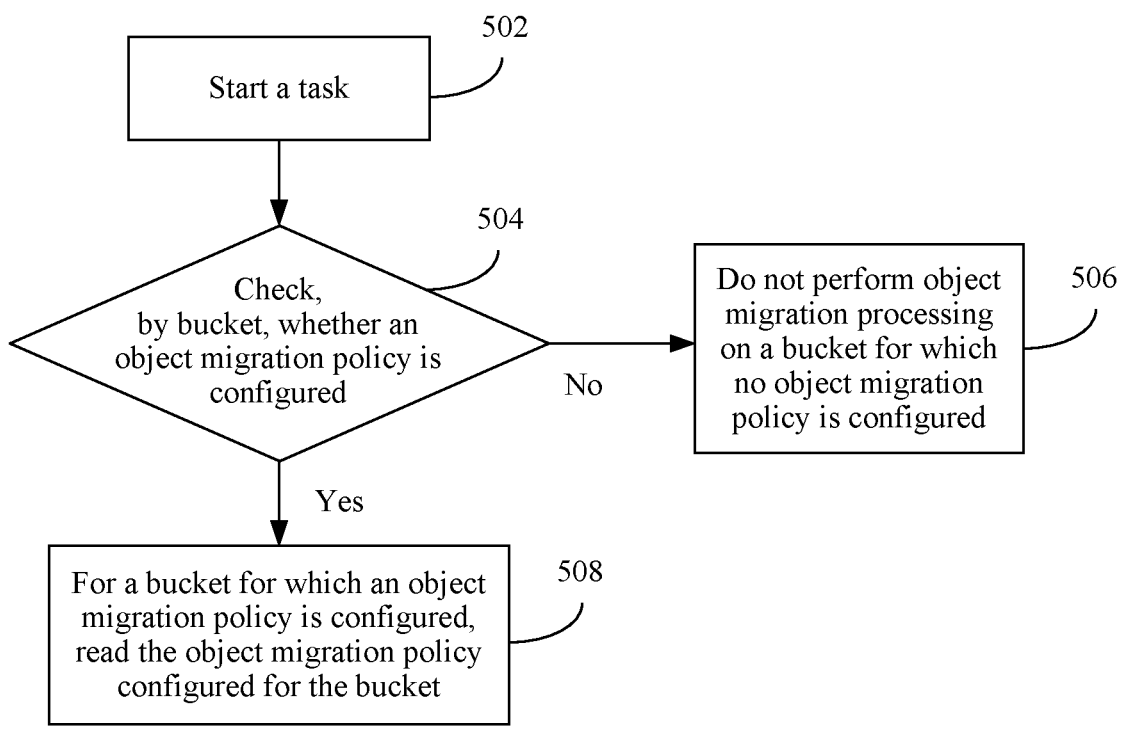
FIG. 5 is a flowchart of an actual application scenario of another object migration method according to an embodiment of the present disclosure.

FIG. 5 shows an actual application scenario of an object migration method according to an embodiment of this disclosure. The method may be applied to the object storage service system 110 shown in FIG. 1 and the method procedures shown in FIG. 2 and FIG. 3. A difference from the foregoing embodiment of the foreground service starting scenario in FIG. 4 is that this embodiment describes a background periodic starting scenario, and an object in a bucket managed by an object storage server is checked once a background task is started. A specific processing process is shown in FIG. 5, and includes the following processing.

502. Start a task.

In a specific embodiment, the object storage server may set a to-be-started task in the background, periodically start the task based on a specific period or a specified time, and perform scanning check on an object in a bucket managed or maintained by the object storage server.

504. The object storage server checks, by bucket, whether an object migration policy is configured for each bucket.

In a specific embodiment, the object storage server checks, by bucket, each bucket managed by the object storage server, to determine whether an object migration policy is configured for each bucket. For example, in a specific check process, the object storage server may query a metadata database for an object migration policy corresponding to each bucket, for example, query whether object migration policy configuration records for different buckets that are shown in Table 2 or Table 3 are recorded in the metadata database.

506. When the object storage server determines that no object migration policy is configured for a bucket, the object storage server does not perform object migration processing on an object in the bucket.

In a specific embodiment, when it is determined, through a query, that an object migration policy configuration corresponding to the bucket is not recorded in the metadata database, an object migration processing procedure is not performed on an object in the bucket, for example, the object migration processing procedure in the embodiment corresponding to FIG. 2 is not performed.

508. When the object storage server determines that an object migration policy is configured for a bucket, the object storage server further obtains the object migration policy corresponding to the bucket.

In a specific embodiment, when it is determined, through a query, that an object migration policy configuration corresponding to the bucket corresponding to the bucket identifier is recorded in the metadata database, the object migration policy corresponding to the bucket is obtained based on the record. For a specific obtaining process, refer to step 202 in the embodiment shown in FIG. 2. Details are not described herein again.

When the obtained object migration policy is a first object migration policy, a subsequent operation of an object migration processing procedure is performed on each object in the bucket according to the first object migration policy. For details, refer to the processing steps 204 to 210 in the embodiment shown in FIG. 2. Details are not described herein again.

For details of processing of different object migration policies of the bucket, refer to the processing in step 408, and details are not described herein again.

After performing an operation of an object migration processing procedure on each object in the bucket, the object storage server further processes an object in another bucket for which an object migration policy is configured, until an operation of an object migration processing procedure is performed on all objects in all buckets managed by the object storage server. A specific process is the same as that described above, and details are not described herein again.

Because in the background periodic starting scenario, an object migration processing procedure is performed on an object in the bucket managed by the object storage server, object migration processing can be relatively totally completed in a relatively timely manner. Therefore, when accessing an object, the storage client can access a migrated object in a timely manner, and object migration processing can be performed without access of a user such that resources configuration and utilization are further optimized.

It may be understood that in the background periodic starting scenario, scanning check and object migration processing are performed, in a specific time period, on objects in all buckets managed by the object storage server. Resources may be occupied to a slightly large extent when many buckets are involved. To avoid relatively great impact on resource utilization or another service, the object storage server may be set to perform scanning check and object migration processing on a specific quantity of buckets instead of all buckets in different time periods, and read other buckets to perform scanning check and object migration processing in another time period such that impact on resource utilization or another service can be reduced.

In actual application, in step 204 in the embodiment shown in FIG. 2, processing in a determining process varies with an object migration policy. FIG. 6 to FIG. 8 respectively illustrate processing procedures of three different object migration policies a first object migration policy in which a frequency of accessing an object is a migration attribute (FIG. 6), a second object migration policy in which importance of an object is a migration attribute (FIG. 7), and a third object migration policy in which a frequency proportion of accessing an object by an access requester in a specific region is a migration attribute (FIG. 8). It should be noted that the embodiments shown in FIG. 6 to FIG. 8 are described using examples in which the embodiments are applied to the foreground service starting scenario shown in FIG. 4. It may be understood that the embodiments shown in FIG. 6 to FIG. 8 may be applied to the background task periodic starting scenario shown in FIG. 5. For a specific process, refer to FIG. 5. Details are not described again in this disclosure.

FIG. 6 shows an object migration method according to an embodiment of the present disclosure. In the method, it is determined, based on a frequency of accessing an object, whether object migration processing is to be performed. The method may be applied to the object storage service system 110 shown in FIG. 1 and the method procedures shown in FIG. 2, FIG. 3, and FIG. 4. As shown in FIG. 6, the object migration method includes the following processing.

602. A storage client accesses an object.

In a specific embodiment, the storage client sends an object access request to an object storage server using an OBS protocol, to request to access a first object in a first bucket created by the storage client. The object access request may include a bucket identifier of the first bucket and an identifier of the first object. For details, refer to step 402. Details are not described herein again.

604. Determine whether to switch to a new statistics period.

In a specific embodiment, after receiving the object access request sent by the storage client, the object storage server obtains an object migration policy corresponding to the first bucket, and when determining that the object migration policy is a first object migration policy in which a frequency of accessing the object is a migration attribute of the object (for a specific process, refer to step 202, step 306, and step 408), the object storage server further determines whether to switch to a new statistics period. The statistics period is a unit for collecting statistics about the frequency of accessing the object. For example, statistics about the frequency of accessing the object are collected once a day or once an hour. After it is determined that switching to a new statistics period needs to be performed, step 606 is performed before step 608. After it is determined that switching to a new statistics period does not need to be performed, step 608 is directly performed.

606. Reset a current statistics value.

In a specific embodiment, after determining that switching to a new statistics period needs to be performed, the object storage server uses the new statistics period as a current statistics period. For example, the object storage server collects statistics once a day instead of previously collecting statistics once an hour. Then the object storage server collects, based on the new statistics period, a quantity of times the first object is accessed before current access, and then performs step 608. It may be understood that the statistics collection described in this disclosure may be statistics collection performed in a specific time period, or may be statistics collection performed throughout an entire life cycle of the object.

608. Increase a quantity of times the object is accessed by 1 in a current statistics period.

In a specific embodiment, the object storage server collects, in the current statistics period, statistics about a frequency of accessing the first object. Based on the foregoing example, when the object storage server determines that switching to a new statistics period does not need to be performed, the object storage server directly collects, once a day, statistics about the frequency of accessing the first object, and increases the quantity of access times by 1 based on the current access request of the storage client. When the object storage server determines that switching to a new statistics period needs to be performed, because the statistics period is reset in step 606, in this step, the object storage server directly increases, on a basis of statistics collected in step 606 (based on the switched-to statistics period), the quantity of access times by 1 based on the current access request of the storage client, to obtain an updated quantity of times the first object is accessed.

It may be understood that in another specific embodiment, neither step 604 nor step 606 may be performed, and step 608 is directly performed after step 602.

610. Determine whether the current quantity of times the object is accessed is less than an attribute value.

In a specific embodiment, the object storage server obtains the attribute value of the migration attribute of the object, for example, a frequency threshold for accessing the object, according to the first object migration policy. The object storage server determines whether the updated quantity of times the first object is accessed is less than an attribute value included in the first object migration policy, namely, the frequency threshold for accessing the object in the foregoing example, for example, less than 100 times per day.

612. Perform object migration processing when a quantity of times a first object is accessed is less than an attribute value in the first object migration policy.

In a specific embodiment, when the quantity of times the first object is accessed is less than the attribute value in the first object migration policy, the object storage server migrates the first object to a destination bucket corresponding to an identifier that is of the destination bucket and that is included in the first object migration policy.

614. Do not perform object migration processing when a quantity of times the first object is accessed is not less than an attribute value in the first object migration policy.

It may be understood that in step 610 to step 614, in another embodiment, the object storage server may further determine whether the quantity of times the first object is accessed is greater than an attribute value included in an object migration policy, for example, less than 100 times per day, and perform object migration processing when the quantity of times the first object is accessed is greater than the attribute value included in the object migration policy, or not perform migration processing otherwise. For details, refer to the descriptions in step 306. Details are not described herein again.

Through processing in this implementation, all frequently accessed objects may be placed in the destination bucket for which more value-added functions or services are configured, and infrequently accessed objects may be placed together in the source bucket for which fewer value-added functions or services are configured such that resource configuration and utilization can be optimized, and resources can be saved correspondingly. The bucket for which more value-added functions or services are configured needs to be supported by more resources such as network resources, processing resources, and/or storage resources.

FIG. 7 shows an object migration method according to an embodiment of the present disclosure. In the method, it is determined, based on importance of an object, whether object migration processing is to be performed. The method may be applied to the object storage service system 110 shown in FIG. 1 and the method procedures shown in FIG.

2, FIG. 3, and FIG. 4. As shown in FIG. 7, the object migration method includes the following processing.

702. A storage client accesses an object.

In a specific embodiment, the storage client sends an object access request to an object storage server using an OBS protocol, to request to access a first object in a first bucket created by the storage client. The object access request may include a bucket identifier of the first bucket and an identifier of the first object. For details, refer to step 402. Details are not described herein again.

704. Obtain a current time of the system.

In a specific embodiment, after receiving the object access request sent by the storage client, the object storage server obtains an object migration policy corresponding to the first bucket, and after determining that the object migration policy is a second object migration policy in which importance of an object is a migration attribute of the object (for a specific process, refer to step 202, step 306, and step 408), the object storage server obtains the current time of the system, namely, the current time of the object storage service system, for example, T1.

706. Determine whether a difference between the current time and a time of uploading the object is greater than or equal to an attribute value.

In a specific embodiment, after determining that the object migration policy is the second object migration policy in which the importance of the object is the migration attribute of the object, the object storage server determines, based on the identifier of the first object that is included in the object access request, a time of uploading the first object to the object storage service system, for example, T2. Then the object storage server subtracts T2 from T1 to obtain the difference between the current time of the system and the time of uploading the first object, and determines, based on the attribute value included in the second object migration policy, whether the difference is greater than or equal to the attribute value, where the attribute value is, for example, a duration threshold for storing the object in the source bucket.

708. Perform object migration processing when the difference between the current time and the time of uploading the object is greater than or equal to the attribute value.

In a specific embodiment, when the difference between the current time and the time of uploading the object is greater than or equal to the attribute value, the object storage server migrates the first object to a destination bucket corresponding to an identifier that is of the destination bucket and that is included in the second object migration policy.

710. Do not perform object migration processing when the difference between the current time and the time of uploading the object is less than the attribute value.

Through processing in this implementation, importance of an object may be determined based on a life cycle of the object. For example, a piece of data with high importance may become data with low importance after a specific time, and may eventually become archive data. Then all objects with relatively high importance are placed in the source bucket for which more value-added functions or services are configured, and objects with relatively low importance are placed in the destination bucket for which fewer value-added functions or services are configured such that resource configuration and utilization can be optimized, and resources can be saved correspondingly. The bucket for which more value-added functions or services are configured needs to be supported by more resources such as network resources, processing resources, and/or storage resources.

It may be understood that the foregoing is merely an example for describing the importance of the object. In another occasion, a piece of data with low importance may become data with high importance after a specific time. Alternatively, whether data is important may be determined based on a criterion other than time, for example, a location of a requester accessing the object.

FIG. 8 shows an object migration method according to an embodiment of the present disclosure. In the method, it is determined, based on a frequency proportion of accessing an object, whether object migration processing is to be performed. The method may be applied to the object storage service system 110 shown in FIG. 1 and the method procedures shown in FIG. 2, FIG. 3, and FIG. 4. As shown in FIG. 8, the object migration method includes the following processing.

802. A storage client accesses an object.

In a specific embodiment, the storage client sends an object access request to an object storage server using an OBS protocol, to request to access a first object in a first bucket created by the storage client. The object access request may include a bucket identifier of the first bucket and an identifier of the first object. For details, refer to step 402. Details are not described herein again.

804. Determine whether to switch to a new statistics period.

In a specific embodiment, after receiving the object access request sent by the storage client, the object storage server obtains an object migration policy corresponding to the first bucket, and when determining that the object migration policy is a third object migration policy in which a migration attribute of an object is a frequency proportion of accessing the object by an access requester in a specific region (for a specific process, refer to step 202, step 306, and step 408), the object storage server further determines whether to switch to a new statistics period. In this embodiment, the specific region is a region to which the storage client belongs, and the region to which the storage client belongs is different from a region to which the first bucket belongs. The statistics period is a unit for collecting statistics about a frequency of accessing the object. For example, statistics about the frequency of accessing the object are collected once a day or once an hour. After it is determined that switching to a new statistics period needs to be performed, step 806 is performed before step 808. After it is determined that switching to a new statistics period does not need to be performed, step 808 is directly performed.

806. Reset a current statistics value.

In a specific embodiment, after determining that switching to a new statistics period needs to be performed, the object storage server uses the new statistics period as a current statistics period. For example, the object storage server collects statistics once a day instead of previously collecting statistics once an hour. Then the object storage server collects, based on the new statistics period, a quantity of times the first object is accessed, before current access of the storage client, by an access requester in the region to which the storage client belongs, and then performs step 808. In addition, in this step, the object storage server further needs to collect, in the current statistics period, statistics about a quantity of times the object is accessed by access requesters in all regions. In a specific embodiment, the object storage server collects, in the current statistics period, statistics about a quantity of times the first object is accessed by the access requesters in all the regions. Based on the foregoing example, when the object storage server determines that switching to a new statistics period does not need to be performed, the object storage server directly collects, once a day, the quantity of times the first object is accessed by the access requesters in all the regions. It may be understood that all the regions in this embodiment are regions to which access requesters having accessed the object belong, and do not include one or more regions in which access requesters have not accessed the object. In addition, it may be understood that the statistics collection described in this disclosure may be statistics collection performed in a specific time period, or may be statistics collection performed throughout an entire life cycle of the object.

808. In a current statistics period, increase, by 1, a quantity of times the object is accessed by an access requester in a region to which the storage client belongs, to obtain an updated quantity of times the object is accessed by the access requester in the region to which the storage client belongs.

In a specific embodiment, the object storage server collects, in the current statistics period, statistics about a quantity of times the first object is accessed by the access requester in the region to which the storage client belongs. Based on the foregoing example, when the object storage server determines that switching to a new statistics period does not need to be performed, the object storage server directly collects, once a day, statistics about the quantity of times the first object is accessed by the access requester in the region to which the storage client belongs, and increases the quantity of access times by 1 based on the current access request of the storage client. When the object storage server determines that switching to a new statistics period needs to be performed, because the statistics period is reset in step 806, in this step, the object storage server directly increases, on a basis of statistics collected in step 806 (based on the switched-to statistics period), the quantity of access times by 1 based on the current access request of the storage client, to obtain an updated quantity of times the first object is accessed by the access requester in the region to which the storage client belongs.

It may be understood that in another specific embodiment, neither step 804 nor step 806 may be performed, and step 808 is directly performed after step 802.

It should be noted that in a scenario in which step 808 is directly performed after step 802, in this step, the object storage server further needs to collect, in the current statistics period, statistics about a quantity of times the object is accessed by the access requesters in all the regions.

810. Determine whether a proportion of the updated quantity of times the object is accessed by the access requester in the region to which the storage client belongs in a quantity of times the object is accessed by access requesters in all regions exceeds a specified attribute value.

In a specific embodiment, it is determined whether a proportion of the updated quantity of times the first object is accessed by the access requester in the region to which the storage client belongs in the quantity of times the first object is accessed by the access requesters in all the regions exceeds the specified attribute value. An attribute value in the third object migration policy is a frequency proportion threshold for accessing the object by the access requester in the specific region (which is, in this embodiment, the region to which the storage client belongs), for example, 20%.

812. Perform object migration processing when the proportion exceeds the specified attribute value.

In a specific embodiment, after the object storage server determines that the proportion of the updated quantity of times the first object is accessed by the access requester in the region to which the storage client belongs in the quantity of times the first object is accessed by the access requesters in all the regions exceeds the specified attribute value (for example, 20%), the object storage server migrates the first object to a destination bucket corresponding to an identifier that is of the destination bucket and that is included in the third object migration policy.

814. Do not perform object migration processing when the proportion does not exceed the specified attribute value.

It may be understood that in this embodiment, a frequency of accessing an object by an access requester in a specific region may be used as a criterion for determining whether to perform migration. For details, refer to the scenario 4 in step 302 and the policy 4 in Table 2 and Table 3 in step 306 in the embodiment shown in FIG. 3. Details are not described herein again.

In this implementation, based on a frequency of accessing an object by an access requester in a specific region, an object frequently accessed by the access requester in the specific region is migrated to the region such that a proximity-based access problem can be better resolved, thereby saving network resources and improving access effectiveness.

It may be understood that the foregoing describes only examples of processing procedures for three different object migration policies. As described in the embodiments shown in FIG. 2 and FIG. 3, in actual application, another object migration policy, for example, the fourth object migration policy, a fifth object migration policy, or even the $N^{th}$ object migration policy in step 306, is further included. For a processing process for the policy, refer to the foregoing processing. Details are not described herein again.

Specific implementations of the object storage server and the storage client in the embodiments shown in FIG. 1 to FIG. 8 are described in detail below with reference to the accompanying drawings.

Figure 9:
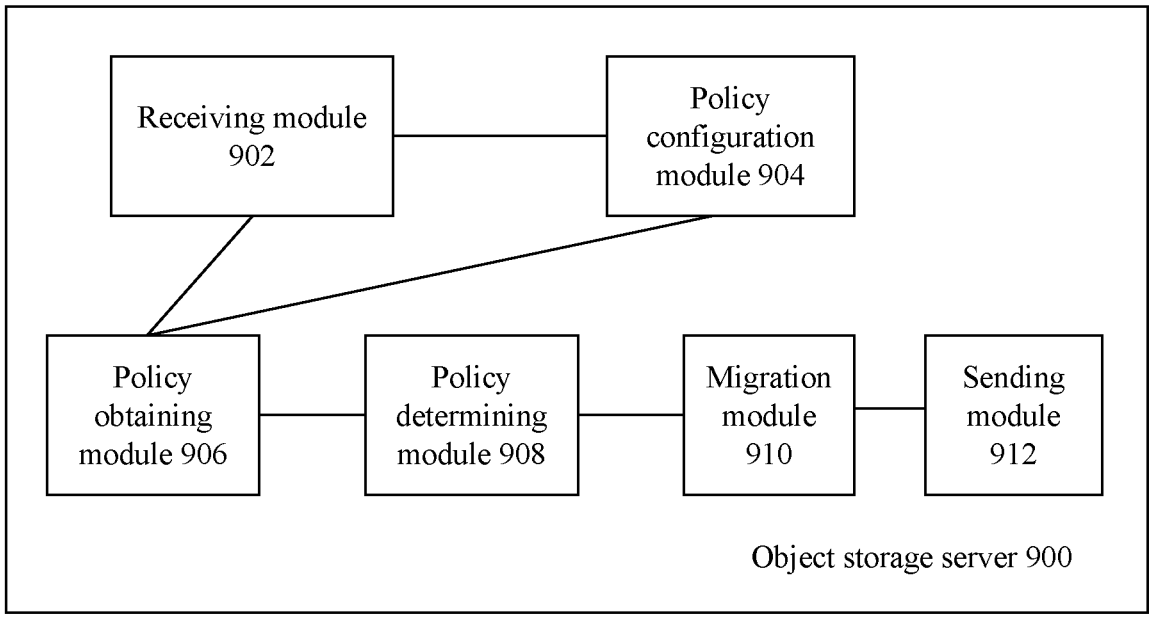
FIG. 9 is a schematic structural diagram of an object storage server according to an embodiment of the present disclosure.

FIG. 9 is a schematic structural diagram of an object storage server according to an embodiment of this disclosure. It should be noted that the object storage server in this embodiment of this disclosure may be implemented using software, and correspondingly, the object storage server is a software module or a program. Alternatively, the object storage server may be implemented using hardware, and correspondingly, the object storage server is an object storage server in a form of hardware, for example, various physical servers. Alternatively, the object storage server may be implemented using a combination of software and hardware, and correspondingly, the object storage server is an object storage server in a form of hardware on which a software module or a computer program that can implement operations performed by the object storage server in the embodiments in FIG. 1 to FIG. 8 is installed, for example, various object storage servers that include processors and in which software modules or computer programs are embedded. The object storage server may be applied to the embodiments shown in FIG. 1 to FIG. 8. The object storage server manages a plurality of buckets, each bucket includes one or more objects, and the object storage server includes a receiving module 902, a policy configuration module 904, a policy obtaining module 906, a policy determining module 908, a migration module 910, and a sending module 912.

The receiving module 902 is configured to receive a migration policy configuration request sent by a storage client, where the migration policy configuration request includes an identifier of a source bucket corresponding to an object migration policy, a migration attribute of an object, an attribute value of the migration attribute, and an identifier of a destination bucket, and the migration attribute of the object includes importance of the object or a frequency of accessing the object, or when the plurality of buckets are distributed in a plurality of different regions, the migration attribute of the object includes a frequency proportion of accessing the object by an access requester in a specific region, where the specific region is different from a region to which the destination bucket belongs. For a detailed processing function of the receiving module 902 or a detailed step that may be performed by the receiving module 902, refer to the detailed descriptions in step 304 in the embodiment shown in FIG. 3.

The policy configuration module 904 is configured to configure the object migration policy for the source bucket according to the migration policy configuration request. For a detailed processing function of the policy configuration module 904 or a detailed step that may be performed by the policy configuration module 904, refer to the detailed descriptions in step 306 in the embodiment shown in FIG. 3.

The policy obtaining module 906 is configured to obtain the object migration policy, where the object migration policy indicates a condition for migrating an object from the source bucket to the destination bucket in the plurality of buckets, and the object migration policy corresponds to the source bucket. For a detailed processing function of the policy obtaining module or a detailed step that may be performed by the policy obtaining module, refer to the detailed descriptions in step 202 in the embodiment shown in FIG. 2.

The policy determining module 908 is configured to determine whether a first object in the source bucket meets the object migration policy. For a detailed processing function of the policy determining module 908 or a detailed step that may be performed by the policy determining module 908, refer to the detailed descriptions in step 204, step 206, and step 210 in the embodiment shown in FIG. 2, the detailed descriptions in step 604 to step 610 in the embodiment shown in FIG. 6, the detailed descriptions in step 704 and step 706 in the embodiment shown in FIG. 7, and the detailed descriptions in step 804 to step 810 in the embodiment shown in FIG. 8.

The migration module 910 is configured to migrate the first object to the destination bucket when the first object meets the object migration policy. For a detailed processing function of the migration module 910 or a detailed step that may be performed by the migration module 910, refer to the detailed descriptions in step 206 in the embodiment shown in FIG. 2, the detailed descriptions in step 612 and step 614 in the embodiment shown in FIG. 6, the detailed descriptions in step 708 and step 710 in the embodiment shown in FIG. 7, and the detailed descriptions in step 812 and step 814 in the embodiment shown in FIG. 8.

The sending module 912 is configured to notify the storage client of a result of the object migration after the object is successfully migrated. For a detailed processing function of the sending module 912 or a detailed step that may be performed by the sending module 912, refer to the detailed descriptions in step 208 in the embodiment shown in FIG. 2 and step 308 in the embodiment shown in FIG. 3.

It should be noted that the module division in the object storage server and the interaction relationship between the modules shown in FIG. 9 are merely examples. In a specific implementation, the modules in the object storage server may be combined, or further divided based on related functions based on the method embodiments shown in FIG. 1 to FIG. 8.

Figure 10:
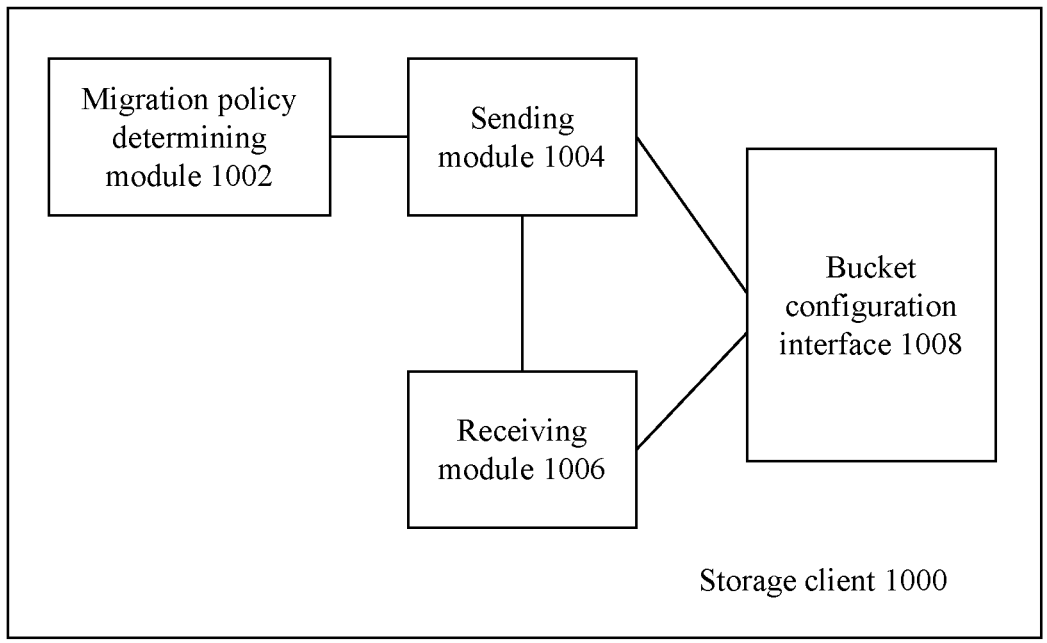
FIG. 10 is a schematic structural diagram of a storage client according to an embodiment of the present disclosure.

FIG. 10 is a schematic structural diagram of a storage client according to an embodiment of this disclosure. It should be noted that the storage client in this embodiment of this disclosure may be implemented using software, and correspondingly, the storage client is a software module, for example, a SDK. Alternatively, the storage client may be implemented using hardware, and correspondingly, the storage client is a storage client in a form of hardware, for example, a personal computer (PC), a mobile terminal, a fixed terminal device, a smart card, a chip, a circuit apparatus, or a thin terminal. Alternatively, the storage client may be implemented using a combination of software and hardware, and correspondingly, the storage client is a storage client in a form of physical hardware on which a software module or a computer program that can implement operations performed by the storage client in the embodiments shown in FIG. 1 to FIG. 8 is installed, for example, various storage clients that include processors and in which software modules or computer programs are embedded, such as a PC, a mobile terminal, a fixed terminal device, a smart card, a chip, a circuit apparatus, or a thin terminal in which a software module or a computer program is embedded.

The storage client may be applied to the embodiments shown in FIG. 1 to FIG. 8. The storage client uses at least two of a plurality of buckets managed by an object storage server, each bucket includes one or more objects, and the storage client includes a migration policy determining module 1002, a sending module 1004, and a receiving module 1006.

The migration policy determining module 1002 is configured to determine a migration policy parameter, where the policy parameter includes a bucket identifier of a source bucket corresponding to an object migration policy, a migration attribute of an object, an attribute value of the migration attribute, and a bucket identifier of a destination bucket. For a detailed processing function of the migration policy determining module 1002 or a detailed step that may be performed by the migration policy determining module 1002, refer to the detailed descriptions in step 302 in the embodiment shown in FIG. 3.

The sending module 1004 is configured to send a migration policy configuration request to the object storage server, to request the object storage server to configure an object migration policy for the source bucket, where the migration policy configuration request includes the migration policy parameter, the object migration policy indicates a condition for migrating an object from the source bucket to the destination bucket, and the migration attribute of the object includes importance of the object or a frequency of accessing the object, or when the plurality of buckets are distributed in a plurality of different regions, the migration attribute of the object includes a frequency proportion of accessing the object by an access requester in a specific region, where the specific region is different from a region to which the destination bucket belongs. For a detailed processing function of the sending module 1004 or a detailed step that may be performed by the sending module 1004, refer to the detailed descriptions in step 304 in the embodiment shown in FIG. 3.

The receiving module 1006 is configured to receive an object migration policy configuration success response message returned by the object storage server. For a detailed processing function of the receiving module 1006 or a detailed step that may be performed by the receiving module 1006, refer to the detailed descriptions in step 308 in the embodiment shown in FIG. 3. In another embodiment, the receiving module may be further configured to receive a notification message sent by the object storage server, to notify the storage client of a result of the object migration. For details, refer to the detailed descriptions in step 208 in the embodiment shown in FIG. 2.

In another specific embodiment, the migration policy determining module 1002 may determine the migration policy parameter for the source bucket based on a configuration status of each bucket used by the storage client, where the configuration status of the bucket includes a value-added function or service of the bucket, and the value-added function or service of the bucket includes at least one of the following network acceleration, high data reliability, storage QoS, storage performance, proximity-based data access, or multi-version control of data.

In another specific embodiment, the storage client further includes a bucket configuration interface 1008, and the sending module 1004 sends the migration policy configuration request to the object storage server through the bucket configuration interface 1008.

It should be understood that the described apparatus embodiment is merely an example. For example, the module division is merely logical function division and may be other division in actual implementation. For example, a plurality of modules, units, or components may be combined, or a module in the plurality of modules, units, or components may be further divided into different function modules. For example, functions of the policy configuration module in the object storage server in the foregoing embodiment may be combined into the policy obtaining module, or the policy configuration module, the policy obtaining module, and the policy determining module are combined into one module. In addition, it should be noted that the coupling or communication connection between the modules or devices displayed or described in the figure may be an indirect coupling or communication connection formed using some interfaces, apparatuses, or units, or may be a coupling or connection in electrical, mechanical, or other forms.

Modules described as separate parts may be physically separate, or may be physically in a same physical component. A component named a module may be a hardware unit, or may be a software module or a logical unit, or a combination of hardware and software. The module may be located in one network element, or may be distributed in a plurality of network elements. Some or all of the units may be selected depending on actual needs to achieve the objectives of the solutions of the embodiments.

Figure 11:
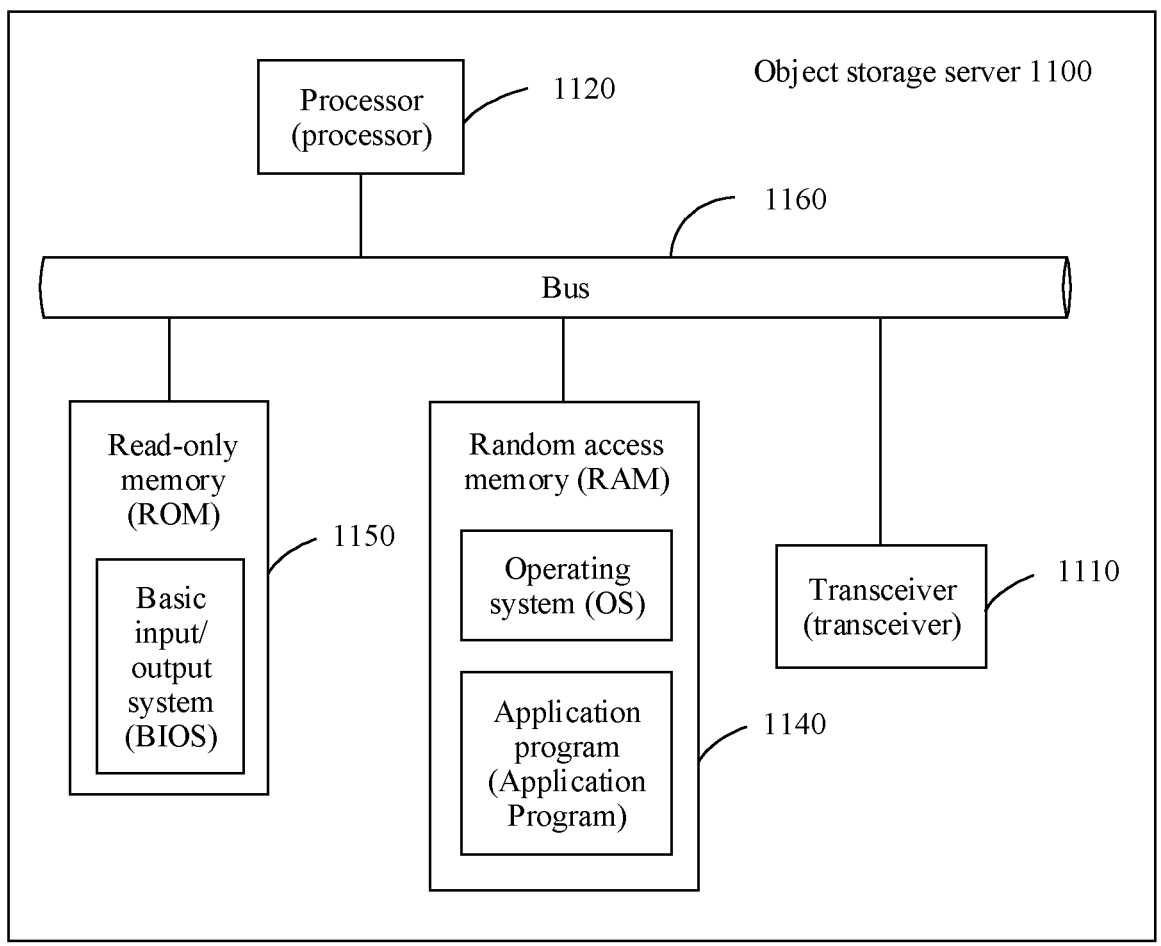
FIG. 11 is a schematic structural diagram of another object storage server according to an embodiment of the present disclosure.

FIG. 11 is a possible schematic structural diagram of an object storage server 1100 according to an embodiment of this disclosure. The object storage server 1100 may be applied to the embodiments shown in FIG. 1 to FIG. 8. In this embodiment, functions or operation steps of the object storage server are implemented by one or more processors in a general-purpose computer or server by executing program code in a memory. In this implementation, the object storage server 1100 includes a transceiver 1110, a processor 1120, a random access memory 1140, a read-only memory 1150, and a bus 1160.

The processor 1120 is separately coupled to the transceiver 1110, the random access memory 1140, and the read-only memory 1150 using the bus 1160.

The processor 1120 may be a general-purpose central processing unit (CPU), a microprocessor, an application-specific integrated circuit (ASIC), or one or more integrated circuits configured to control program execution of the solutions of the present disclosure.

The bus 1160 may include a channel for transmitting information between the components.

The transceiver 1110 is configured to communicate with another device or a communications network, for example, an Ethernet network, a radio access network (RAN), or a wireless local area network (WLAN). In this embodiment of the present disclosure, the transceiver 1110 may be configured to communicate with a storage client.

The random access memory 1140 may load application program code that implements the object storage server in the embodiments shown in FIG. 2 to FIG. 8, and the processor 1120 controls execution of the application program code.

When the object storage server 1100 needs to run, a basic input/output system or a bootloader in an embedded system that is built into the read-only memory 1150 is used to lead a system to start, and lead the object storage server 1100 to enter a normal running state. After the object storage server 1100 enters the normal running state, the processor 1120 runs an application program and an operating system in the random access memory 1140 such that the object storage server 1100 can perform functions and operations in the embodiments shown in FIG. 2 to FIG. 8.

Interaction with the storage client is completed by the transceiver 1110 under control of the processor 1120, and internal processing (for example, configuring an object migration policy, obtaining an object migration policy, determining an object migration policy, and object migration processing) in the object storage server 1100 is completed by the processor 1120.

It should be noted that in the foregoing implementation, in addition to conventional manners such as the foregoing several manners in which the processor executes a program code instruction in the memory, in this implementation, a virtual object storage server may be implemented based on a physical server using a network functions virtualization (NFV) technology, where the virtual object storage server may be a virtual network device or server. After reading this disclosure, a person skilled in the art may virtualize a plurality of object storage servers with the foregoing functions on a physical server using the NFV technology. Details are not described herein.

Figure 12:
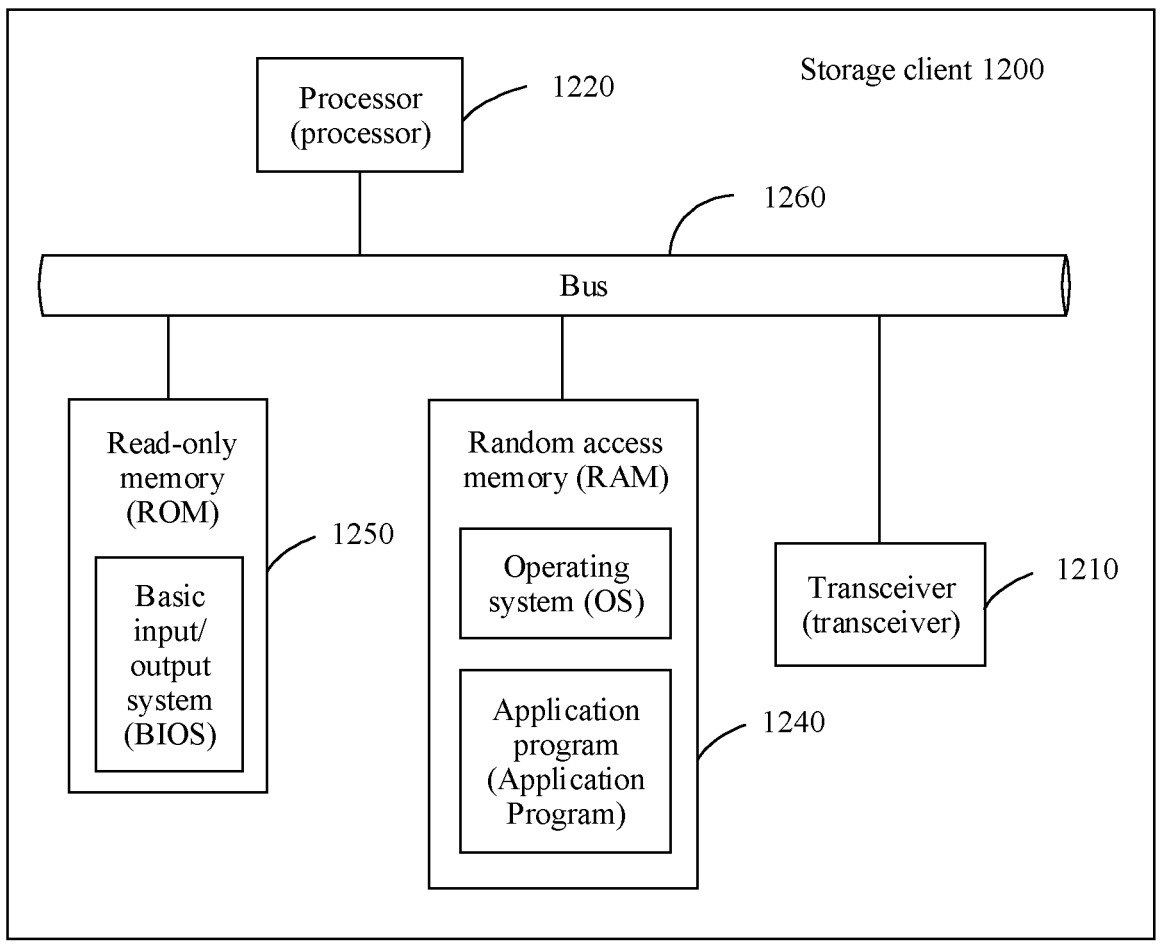
FIG. 12 is a schematic structural diagram of a storage client according to an embodiment of the present disclosure.

FIG. 12 is a possible schematic structural diagram of a storage client 1200 according to an embodiment of this disclosure. The storage client 1200 may be applied to the embodiments shown in FIG. 1 to FIG. 8. In this embodiment, functions or operation steps of the storage client 1200 are implemented by one or more processors in a general-purpose computer or server by executing program code in a memory. In this implementation, the storage client 1200 may include a transceiver 1210, a processor 1220, a random access memory 1240, a read-only memory 1250, and a bus 1260.

The processor 1220 is separately coupled to the transceiver 1210, the random access memory 1240, and the read-only memory 1250 using the bus 1260.

The processor 1220 may be a general-purpose CPU, a microprocessor, an ASIC, or one or more integrated circuits configured to control program execution of the solutions of the present disclosure.

The bus 1260 may include a channel for transmitting information between the components.

The transceiver 1210 is configured to communicate with another device or a communications network, for example, an Ethernet network, a RAN, or a WLAN. In this embodiment of the present disclosure, the transceiver 1210 may be configured to communicate with an object storage server.

The random access memory 1240 may load application program code that implements the storage client in the embodiments shown in FIG. 2 to FIG. 8, and the processor 1220 controls execution of the application program code.

When the storage client 1200 needs to run, a basic input/output system or a bootloader in an embedded system that is built into the read-only memory 1250 is used to lead a system to start, and lead the storage client 1200 to enter a normal running state. After the storage client 1200 enters the normal running state, the processor 1220 runs an application program and an operating system in the random access memory 1240 such that the storage client 1200 can perform functions and operations in the embodiments shown in FIG. 2 to FIG. 8.

Interaction with the object storage server is completed by the transceiver 1210 under control of the processor 1220, and internal processing (for example, determining a migration policy parameter, and generating a migration policy configuration request message) in the storage client 1200 is completed by the processor 1220.

It should be noted that in the foregoing implementation, in addition to conventional manners such as the foregoing several manners in which the processor executes a program code instruction in the memory, in this implementation, a virtual storage client may be implemented based on a physical server using a NFV technology, where the virtual storage client may be a virtual network device or computer. After reading this disclosure, a person skilled in the art may virtualize a plurality of storage clients with the foregoing functions on a physical server using the NFV technology. Details are not described herein.

An embodiment of the present disclosure further provides a computer storage medium configured to store a computer software instruction used by the object storage server. The computer software instruction includes a program designed for performing the functions of the object storage server in the embodiments shown in FIG. 2 to FIG. 8.

An embodiment of the present disclosure further provides a computer storage medium configured to store a computer software instruction used by the storage client. The computer software instruction includes a program designed for performing the functions of the storage client in the embodiments shown in FIG. 2 to FIG. 8.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a plurality of. A single processor or another single unit may implement one or more functions enumerated in the claims. Some measures are described in dependent claims that are different from each other, but this does not mean that these measures cannot be combined to produce a better effect.

A person skilled in the art should understand that the embodiments of this disclosure may be provided as a method, an apparatus, or a computer program product. Therefore, the embodiments of this disclosure may use a form of hardware embodiments, software embodiments, or embodiments with a combination of software and hardware. Moreover, this disclosure may use a form of a computer program product that is implemented on one or more computer-usable storage media (including but not limited to a disk memory, a compact disc-read only memory (CD-ROM), an optical memory, and the like) that include computer usable program code. A computer program is stored/distributed in a proper medium and is provided together with other hardware or is used as a part of hardware, or may be distributed in another form, for example, through the Internet or another wired or wireless telecommunications system.

The present disclosure is described with reference to the flowcharts and/or block diagrams of the method, the apparatus, and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a special-purpose computer, an embedded processor, or a processor of another programmable data processing device to generate a machine such that the instructions executed by the computer or the processor of the other programmable data processing device generate an apparatus for implementing a specified function in one or more processes in the flowcharts and/or in one or more blocks in the block diagrams.

These computer program instructions may alternatively be stored in a computer-readable memory that can instruct a computer or another programmable data processing device to work in a specific manner such that the instructions stored in the computer-readable memory generate an artifact that includes an instruction apparatus. The instruction apparatus implements a specified function in one or more processes in the flowcharts and/or in one or more blocks in the block diagrams. These computer program instructions may alternatively be loaded onto a computer or another programmable data processing device such that a series of operations and steps are performed on the computer or the other programmable device, thereby generating computer-implemented processing. Therefore, the instructions executed on the computer or the other programmable device provides steps for implementing a specified function in one or more processes in the flowcharts and/or in one or more blocks in the block diagrams.

Although the present disclosure is described with reference to specific features and the embodiments thereof, apparently, various modifications and combinations may be made to them without departing from the spirit and scope of the present disclosure. Correspondingly, the specification and accompanying drawings are merely examples of descriptions of the present disclosure defined by the appended claims, and are considered as covering any or all of modifications, variations, combinations, or equivalents within the scope of the present disclosure. Apparently, a person skilled in the art can make various modifications and variations to the present disclosure without departing from the spirit and scope of the present disclosure. The present disclosure is intended to cover these modifications and variations provided that they fall within the scope of protection defined by the following claims and equivalent technologies thereof

What is claimed is:

1. An object migration method implemented by an object storage server in a storage system, wherein the object migration method comprises:

determining whether a first object in a source bucket meets an object migration policy which indicates a condition for migrating an object from the source bucket to a destination bucket in a plurality of buckets, wherein the object migration policy comprises a migration attribute of the object;

collecting statistics about quantities of times the first object in the source bucket is accessed by access requesters in different regions when the migration attribute comprises a frequency proportion of accessing the object by an access requester in a specific region different from a region to which the destination bucket belongs;

receiving a migration policy configuration request from a storage client, wherein the migration policy configuration request comprises an attribute value of the migration attribute, and wherein the attribute value is a frequency proportion threshold for accessing the object by the access requester when the migration attribute is the frequency proportion; and migrating the first object to the destination bucket when the first object meets the object migration policy and based on the attribute value.

2. The object migration method of claim 1, wherein the migration policy configuration request further comprises a first identifier of the source bucket, the migration attribute, and a second identifier of the destination bucket, wherein the migration attribute comprises an importance of the object, a frequency of accessing the object, or the frequency proportion, and wherein the object migration method further comprises configuring the object migration policy for the source bucket according to the migration policy configuration request.

3. The object migration method of claim 1, further comprising:

receiving an object access request from a storage client, wherein the object access request requests access to the object in the source bucket; and checking whether the object migration policy is configured for the source bucket according to the object access request; and reading the object migration policy after determining that the object migration policy is configured for the source bucket.

4. The object migration method of claim 3, wherein before migrating the first object to the destination bucket, the object migration method further comprises returning the first object to the storage client when the object that the object access request requests to access is the first object.

5. The object migration method of claim 1, further comprising:

checking whether the object migration policy is configured for each of the buckets based on a preset time; and reading the object migration policy after determining that the object migration policy is configured for the source bucket.

6. The object migration method of claim 2, wherein the attribute value is a duration threshold for storing the object in the source bucket when the migration attribute is the importance of the object, and wherein the object migration method further comprises:

obtaining a current time of the object storage server;

obtaining, through comparison, a time difference between the current time and a time of uploading the first object to the source bucket;

determining whether the time difference is greater than or equal to the attribute value; and migrating the first object to the destination bucket when the time difference is greater than or equal to the attribute value.

7. The object migration method of claim 2, wherein the attribute value is a frequency threshold for accessing the object when the migration attribute is the frequency, and wherein the object migration method further comprises:

collecting first statistics about the frequency;

determining whether the frequency is greater than or equal to the attribute value; and migrating the first object to the destination bucket when the frequency is greater than or equal to the attribute value.

8. The object migration method of claim 2, wherein the attribute value is a frequency threshold for accessing the object when the migration attribute is the frequency of accessing the object, and wherein the object migration method further comprises:

collecting first statistics about a frequency of accessing the first object in the source bucket;

determining whether the frequency is less than or equal to the attribute value; and migrating the first object to the destination bucket when the frequency is less than or equal to the attribute value.

9. The object migration method of claim 7, further comprising:

determining whether to switch between a statistics period and a new statistics period; and collecting, using the new statistics period, the first statistics when switching to the new statistics period.

10. The object migration method of claim 2, wherein the object migration method further comprises:

collecting second statistics about a first quantity of times the first object in the source bucket is accessed by the access requester;

collecting third statistics about a second quantity of times the first object in the source bucket is accessed by access requesters in a plurality of different regions;

obtaining, through comparison, a proportion of the first quantity of times to the second quantity of times;

determining whether the proportion is greater than or equal to the attribute value; and migrating the first object to the destination bucket when the proportion is greater than or equal to the attribute value, wherein a region to which the destination bucket belongs is the specific region.

11. The object migration method of claim 10, further comprising:

determining whether to switch between a statistics period and a new statistics period; and collecting, using the new statistics period, the second statistics and the third statistics when switching to the new statistics period.

12. An object storage server in a storage system and comprising:

a memory configured to store instructions; and a processor coupled to the memory and configured to execute the instructions to cause the object storage server to:

determine whether a first object in a source bucket meets an object migration policy which indicates a condition for migrating an object from the source bucket to a destination bucket in a plurality of buckets, wherein the object migration policy comprises a migration attribute of the object;

collect statistics about quantities of times the first object in the source bucket is accessed by access requesters in different regions when the migration attribute comprises a frequency proportion of accessing the object by an access requester in a specific region different from a region to which the destination bucket belongs;

receive a migration policy configuration request from a storage client, wherein the migration policy configuration request comprises an attribute value of the migration attribute, and wherein the attribute value is a frequency proportion threshold for accessing the object by the access requester when the migration attribute is the frequency proportion; and migrate the first object to the destination bucket when the first object meets the object migration policy and based on the attribute value.

13. The object storage server of claim 12, wherein the migration policy configuration request further comprises a first identifier of the source bucket, the migration attribute, and a second identifier of the destination bucket, wherein the migration attribute comprises an importance of the object, a frequency of accessing the object, or the frequency proportion, and wherein the processor is further configured to execute the instructions to cause the object storage server to configure the object migration policy for the source bucket according to the migration policy configuration request.

14. The object storage server of claim 12, wherein the processor is further configured to execute the instructions to cause the object storage server to:

receive an object access request from a storage client, wherein the object access request requests to access the object in the source bucket; and check whether the object migration policy is configured for the source bucket according to the object access request; and read the object migration policy when the object migration policy is configured for the source bucket.

15. The object storage server of claim 13, wherein the attribute value is a duration threshold for storing the object in the source bucket when the migration attribute is the importance of the object, and wherein the processor is further configured to execute the instructions to cause the object storage server to:

determine that the first object is an important object;

obtain a current time of the object storage server;

obtain, through comparison, a time difference between the current time of the object storage server and a time of uploading the first object to the source bucket;

determine whether the time difference is greater than or equal to the attribute value; and migrate the first object to the destination bucket when the time difference is greater than or equal to the attribute value.

16. The object storage server of claim 13, wherein the attribute value of the migration attribute is a frequency threshold for accessing the object when the migration attribute is the frequency of accessing the object, and wherein the processor is further configured to execute the instructions to cause the object storage server:

collect first statistics about a frequency of accessing the first object in the source bucket;

determine whether the frequency of accessing the first object is greater than or equal to the attribute value; and migrate the first object to the destination bucket when the frequency of accessing the first object is greater than or equal to the attribute value.

17. The object storage server of claim 13, wherein the processor is further configured to execute the instructions to cause the object storage server to be configured to:

collect second statistics about a quantity of times the first object in the source bucket is accessed by the access requester;

collect third statistics about a quantity of times the first object in the source bucket is accessed by access requesters in a plurality of different regions;

obtain, through comparison, a proportion of the quantity of times the first object in the source bucket is accessed by the access requester in the quantity of times the first object in the source bucket is accessed by the access requesters;

determine whether the proportion is greater than or equal to the attribute value; and migrate the first object to the destination bucket when the proportion is greater than or equal to the attribute value, wherein the region to which the destination bucket belongs is the specific region.

18. A storage system comprising:

a plurality of buckets, wherein each of the buckets comprises one or more objects; and an object storage server configured to:

determine whether a first object in a source bucket meets an object migration policy which indicates a condition for migrating an object from the source bucket to a destination bucket in the buckets, wherein the object migration policy comprises a migration attribute of the object;

collect statistics about quantities of times the first object in the source bucket is accessed by access requesters in different regions when the migration attribute comprises a frequency proportion of accessing the object by an access requester in a specific region different from a region to which the destination bucket belongs;

receive a migration policy configuration request from a storage client, wherein the migration policy configuration request comprises an attribute value of the migration attribute, and wherein the attribute value is a frequency proportion threshold for accessing the object by the access requester when the migration attribute is the frequency proportion; and migrate the first object to the destination bucket when the first object meets the object migration policy and based on the attribute value.

19. The storage system of claim 18, wherein the migration policy configuration request further comprises a first identifier of the source bucket, the migration attribute, and a second identifier of the destination bucket, wherein the migration attribute comprises an importance of the object, a frequency of accessing the object, or the frequency proportion, and wherein the object storage server is further configured to configure the object migration policy for the source bucket according to the migration policy configuration request.

20. The storage system of claim 18, wherein the object storage server is further configured to:

receive an object access request from a storage client, wherein the object access request requests to access the object in the source bucket;

check whether the object migration policy is configured for the source bucket according to the object access request; and read the object migration policy when the object migration policy is configured for the source bucket.

* * * * *